(12) United States Patent
Take

(10) Patent No.: US 11,875,946 B2
(45) Date of Patent: Jan. 16, 2024

(54) CERAMIC ELECTRONIC COMPONENT, SUBSTRATE ARRANGEMENT, AND METHOD OF MANUFACTURING CERAMIC ELECTRONIC COMPONENT

(71) Applicant: TAIYO YUDEN CO., LTD., Tokyo (JP)

(72) Inventor: Yoshinari Take, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 4 days.

(21) Appl. No.: 17/673,666

(22) Filed: Feb. 16, 2022

(65) Prior Publication Data

US 2022/0301779 A1    Sep. 22, 2022

(30) Foreign Application Priority Data

Mar. 16, 2021   (JP) ................................ 2021-042306

(51) Int. Cl.
*H01G 4/232* (2006.01)
*H01G 4/30* (2006.01)
*H01G 4/248* (2006.01)

(52) U.S. Cl.
CPC ........... *H01G 4/2325* (2013.01); *H01G 4/248* (2013.01); *H01G 4/30* (2013.01)

(58) Field of Classification Search
None
See application file for complete search history.

(56) References Cited

U.S. PATENT DOCUMENTS

| 6,903,919 | B2 * | 6/2005 | Kayatani | H01G 2/103 |
| | | | | 29/25.42 |
| 9,653,212 | B2 * | 5/2017 | Lee | H01G 4/012 |
| 9,758,695 | B2 * | 9/2017 | Hong | H01G 4/232 |
| 9,818,510 | B2 * | 11/2017 | Mori | H01G 4/2325 |
| 9,818,511 | B2 * | 11/2017 | Mori | H01G 4/30 |
| 9,978,523 | B1 | 5/2018 | Park et al. | |

(Continued)

FOREIGN PATENT DOCUMENTS

JP    2020-021930 A    2/2020

OTHER PUBLICATIONS

U.S. Appl. No. 17/667,431, filed Feb. 8, 2022.
(Continued)

*Primary Examiner* — Dion R. Ferguson
(74) *Attorney, Agent, or Firm* — CHEN YOSHIMURA LLP

(57) ABSTRACT

A ceramic electronic component includes an element body including a dielectric and internal electrodes; a pair of external electrodes respectively formed on side surfaces of the element body, each of the external electrodes including a base layer and a plating layer formed on at least a part of the base layer, the base layer of each of the external electrodes containing metal and being formed to continuously cover a portion of a lower surface of the element body and the corresponding side surface of the element body connected to the lower surface, the base layer of each of the external electrodes being electrically connected to one or more of the internal electrodes; and an insulating layer formed on an upper surface of the element body, the insulating layer having a thickness that is less than a thickness of the plating layer of each of the external electrodes.

20 Claims, 13 Drawing Sheets

(56) References Cited

U.S. PATENT DOCUMENTS

| | | | |
|---|---|---|---|
| 10,186,367 B2* | 1/2019 | Lee | H01F 17/0013 |
| 10,366,834 B1* | 7/2019 | Lee | H01G 4/1209 |
| 10,734,142 B2* | 8/2020 | Mori | H01F 27/292 |
| 11,158,455 B2* | 10/2021 | Yoon | H01G 4/12 |
| 11,183,332 B2* | 11/2021 | Kim | H01G 4/1218 |
| 11,342,122 B2* | 5/2022 | Masunari | H01G 4/1218 |
| 11,600,443 B2* | 3/2023 | Kim | H01G 4/224 |
| 2004/0217445 A1* | 11/2004 | Sakashita | H01G 4/30 257/E27.048 |
| 2007/0076348 A1* | 4/2007 | Shioga | H05K 1/162 361/307 |
| 2010/0232126 A1 | 9/2010 | Maeda et al. | |
| 2010/0290172 A1* | 11/2010 | Motoki | H01G 4/2325 427/79 |
| 2010/0302704 A1* | 12/2010 | Ogawa | H01G 4/2325 361/306.3 |
| 2013/0020913 A1* | 1/2013 | Shirakawa | H01G 4/224 336/200 |
| 2014/0085767 A1 | 3/2014 | Kang | |
| 2015/0016014 A1 | 1/2015 | Park et al. | |
| 2015/0084481 A1* | 3/2015 | Mori | H01G 4/252 29/829 |
| 2015/0084487 A1 | 3/2015 | Mori et al. | |
| 2017/0256359 A1 | 9/2017 | Masunari | |
| 2017/0367187 A1 | 12/2017 | Chae et al. | |
| 2018/0025844 A1 | 1/2018 | Sato et al. | |
| 2018/0182550 A1 | 6/2018 | Sasaki et al. | |
| 2019/0131076 A1 | 5/2019 | Fukumura | |
| 2019/0346641 A1 | 11/2019 | Schlepple et al. | |
| 2019/0385795 A1 | 12/2019 | Yang et al. | |
| 2020/0035417 A1* | 1/2020 | Sakurai | H01G 4/258 |
| 2020/0066447 A1 | 2/2020 | Murai et al. | |
| 2021/0082622 A1 | 3/2021 | Kim | H01G 4/232 |
| 2021/0183581 A1* | 6/2021 | Nakano | H01G 2/065 |
| 2021/0327648 A1* | 10/2021 | Kanzaki | H01G 4/12 |
| 2022/0068566 A1* | 3/2022 | Ikebe | H01G 4/012 |
| 2022/0139616 A1* | 5/2022 | Kang | H01G 4/248 361/301.4 |
| 2022/0172899 A1* | 6/2022 | Lee | H01G 4/14 |
| 2022/0208456 A1* | 6/2022 | Lee | H01G 4/0085 |
| 2022/0208457 A1* | 6/2022 | Lee | H01G 4/30 |
| 2022/0301778 A1* | 9/2022 | Suga | H05K 1/181 |
| 2022/0301779 A1* | 9/2022 | Take | H01G 4/2325 |
| 2022/0301781 A1* | 9/2022 | Takei | H01G 2/065 |

OTHER PUBLICATIONS

U.S. Appl. No. 17/684,555, filed Mar. 2, 2022.
Office Action dated Aug. 10, 2023 in U.S. Appl. No. 17/684,555 which has been cross-referenced to the instant application. U.S. Patent document 1 and U.S. Patent Publication documents 1-12 listed above were cited in that Office Action.

* cited by examiner

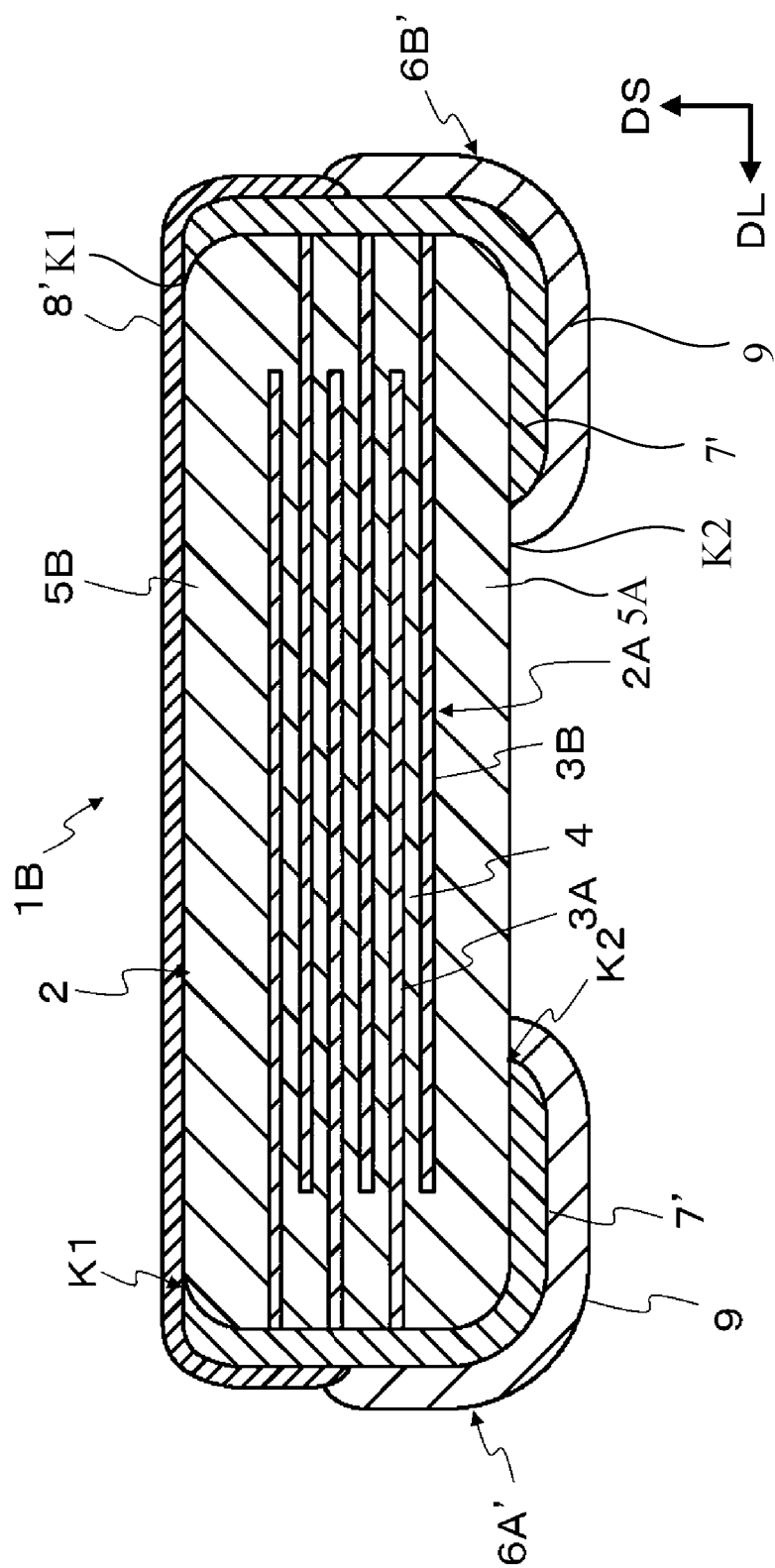

CERAMIC ELECTRONIC COMPONENT, SUBSTRATE ARRANGEMENT, AND METHOD OF MANUFACTURING CERAMIC ELECTRONIC COMPONENT

TECHNICAL FIELD

The present invention relates to ceramic electronic components, substrate arrangements, and methods of manufacturing ceramic electronic components.

RELATED ART

As electronic devices become smaller and more sophisticated, mounting density of electronic components mounted on a substrate has been increasing. In order to reduce the mounting area on the mounting side for IC (Integrated Circuit) chips, etc., multilayer ceramic capacitors are made thinner and are mounted on the opposite side of the mounting side for IC chips. This technique is referred to as a LSC (land-side capacitor).

If an element body is made thinner to reduce the height (thickness) of a multilayer ceramic capacitor, the strength of the multilayer ceramic capacitor is deteriorated, resulting in that the multilayer ceramic capacitor may crack during mounting.

Patent Document 1 discloses a multilayer ceramic capacitor in which terminal electrodes are not substantially formed on the bottom surface of an element body to reduce the height of the multilayer ceramic capacitor without making the element body thinner. In the method disclosed in Patent Document 1, in order to prevent terminal electrodes from being substantially formed on the lower surface of the element body, lower surfaces of two element bodies bonded together, and terminal electrodes are formed around the with two element bodies. Then, these element bodies are separated.

Patent Document 1: JP-A-2020-021930

SUMMARY OF THE INVENTION

However, in the product disclosed in Patent Document 1, if solder for mounting the multilayer ceramic capacitor on a substrate the wets up to the top surface of the element body through the external electrodes on the side surfaces of the element body, it may cause an increase in the height of the multilayer ceramic capacitor after mounting.

Accordingly, it is an object of the present invention to provide a ceramic electronic component that can minimize increase in height after mounting, a substrate arrangement having the ceramic electronic component, and a method of manufacturing the ceramic electronic component.

According to one aspect of the present invention, there is provided a ceramic electronic component including an element body including a dielectric and internal electrodes, the element body having an upper surface, a lower surface, and side surfaces; a pair of external electrodes respectively formed on side surfaces of the element body, each of the external electrodes including a base layer and a plating layer formed on at least a part of the base layer, the base layer of each of the external electrodes containing metal and being formed to continuously cover a portion of the lower surface of the element body and the corresponding side surface of the element body connected to the lower surface, the base layer of each of the external electrodes being electrically connected to one or more of the internal electrodes; and an insulating layer formed on the upper surface of the element body, the insulating layer having a thickness that is less than a thickness of the plating layer of each of the external electrodes.

A boundary between the insulating layer and the plating layer of each of the external electrodes may be positioned at a level between the upper surface and the lower surface of the element body and may be distant at least 10 micrometers from the upper surface.

The insulating layer may have a thickness of 0.01 micrometers to five micrometers.

The base layer of each of the external electrodes may continuously cover the portion of the lower surface of the element body and the corresponding side surface as well as a portion of the upper surface of the element body connected to the side surfaces. The plating layer on each of the base layers may continuously cover the portion of the lower surface of the element body and a portion of the corresponding side surface of the element body. The plating layer of each of the external electrodes may be absent on the upper surface of the element body.

The insulating layer may continuously cover the upper surface and upper portions of the side surfaces of the element body that are connected to the upper surface. A boundary between the insulating layer and the plating layer of each of the external electrodes may be located on a portion of the corresponding base layer that is on the corresponding side surface of the element body.

The element body may further have a front surface and a rear surface that are perpendicular to said side surfaces and the upper and lower surfaces, thereby the element body having a generally cuboid shape. The base layer of each of the external electrodes may continuously cover the corresponding side surface as well as respective portions of the upper and lower surfaces and the front and rear surfaces of the element body that are connected to the side surface. The insulating layer may continuously cover the upper surface and respective upper portions of the side surfaces and the front and rear surfaces of the element body that are connected to the upper surface. The insulating layer may be absent on the lower surface. The plating layer of each of the external electrodes may continuously cover the portion of the lower surface of the element body and respective lower portions of the corresponding side surface and the front and rear surfaces that are connected to the portion of the lower surface.

The plating layer may be absent on the upper surface of the element body.

The base layer of each of the external electrodes may also cover a portion of the upper surface of the element body that is connected to the corresponding side surface, and the insulating layer may cover an edge of the base layer of each of the external electrodes on the upper surface of the element body.

The insulating layer may include a deposition film.

The insulating layer may have a Vickers hardness that is greater than a Vickers hardness of the element body.

The insulating layer may be made of at least one of a metal oxide, a nitride, diamond, and diamond-like carbon.

The insulating layer may be an oxide film of Al or an oxide film of Zr.

Each of the external electrodes may further include an electroconductive layer formed on the lower surface of the element body and on a part of the base layer that is on the lower surface, and the electroconductive layer may have a thickness that is less than a thickness of the base layer.

The base layer may have a thickness that is two micrometers or less.

The base layer may contain a co-material dispersed in the metal.

The co-material may be an oxide ceramic.

The element body may further include, as the internal electrodes, a first internal electrode and a second internal electrode laminated over the first internal electrode via said dielectric interposed therebetween. One of the external electrodes may be connected to the first internal electrode at one of the side surfaces of the element body and another of the external electrodes may be connected to the second internal electrode at another of the side surfaces of the element body.

According to another aspect of the present invention, there is provided an arrangement including a mounting substrate; and the ceramic electronic component mounted on a surface of the mounting substrate, and the ceramic electronic component may be connected to the mounting substrate via solder layers. The solder layers may be adhered to the plating layers of the external electrode, respectively. Each of the solder layers may be in surface contact with a side surface of the corresponding plating layer and may be located below an upper surface of the insulating layer.

According to another aspect of the present invention, there is provided a method of manufacturing a ceramic electronic component. The method includes forming an element body that includes a dielectric and internal electrodes, the element body having an upper surface, a lower surface, and side surfaces; applying a base material for base layers of external electrodes onto the lower surface and the side surfaces of the element body; sintering the base material to form the base layers of external electrodes, the base layer of each of the external electrodes having a lower part formed on the lower surface of the element body and a side part formed on one of the side surfaces of the element body and being electrically connected to one or more of the internal electrodes; thereafter, forming an insulating layer on the upper surface of the element body and on respective portions of the base layers that are respectively on the side surfaces of the element body; and forming plating layers on the base layers, respectively, each of the plating layers being formed on the lower part and portion of the side part of the corresponding base layer.

Forming the insulating layer may include depositing an insulating material.

According to the present invention, increase in height of ceramic electronic components after mounting can be minimized.

BRIEF DESCRIPTION OF THE DRAWINGS

FIG. 6A is a cross-sectional view of a multilayer ceramic capacitor according to a third embodiment of the present invention taken in the same manner as in FIG. 2A;

DESCRIPTION OF EMBODIMENTS

Figure 1:
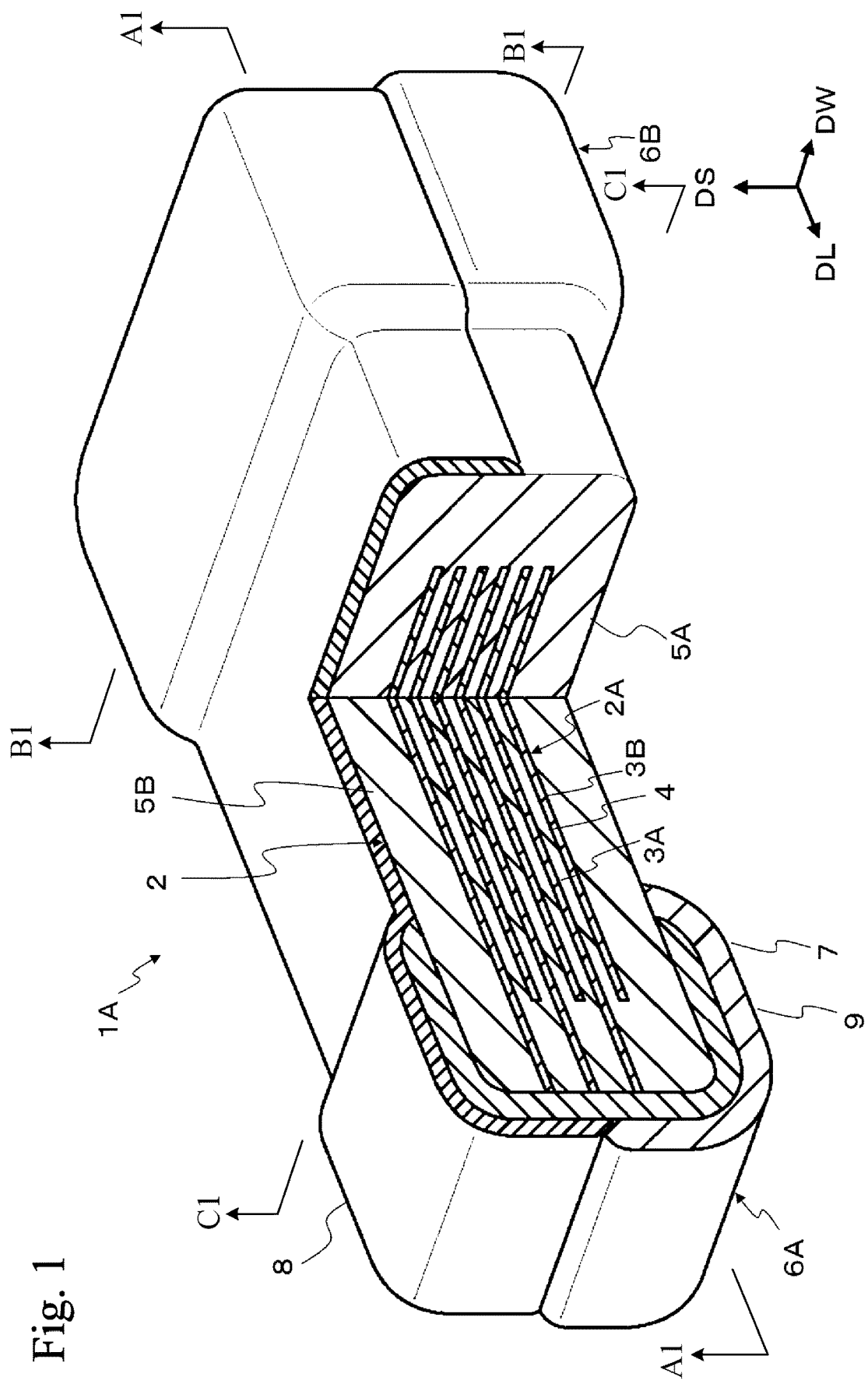
FIG. 1 is a perspective view showing a multilayer ceramic capacitor according to a first embodiment of the present invention.

Embodiments of the present invention will now be described with reference to the accompanying drawings. The following embodiments are not intended to limit the present invention. The combination of all the features described in each of the embodiments is not absolutely necessary for the present invention. The configuration of each embodiment may be modified and/or changed depending upon designs, specifications, and various conditions of an apparatus and a device to which the present invention is applied (use conditions, use environment, and the like). The technical scope of the invention is defined by the appended claims and is not limited by the following embodiments. Furthermore, parts, components, and elements shown in the drawings used in connection with the following description may be different from actual parts, components, and elements in the structure, scale, and shape for the sake of easier understanding of the parts, components, and elements.

First Embodiment

Figure 2A:
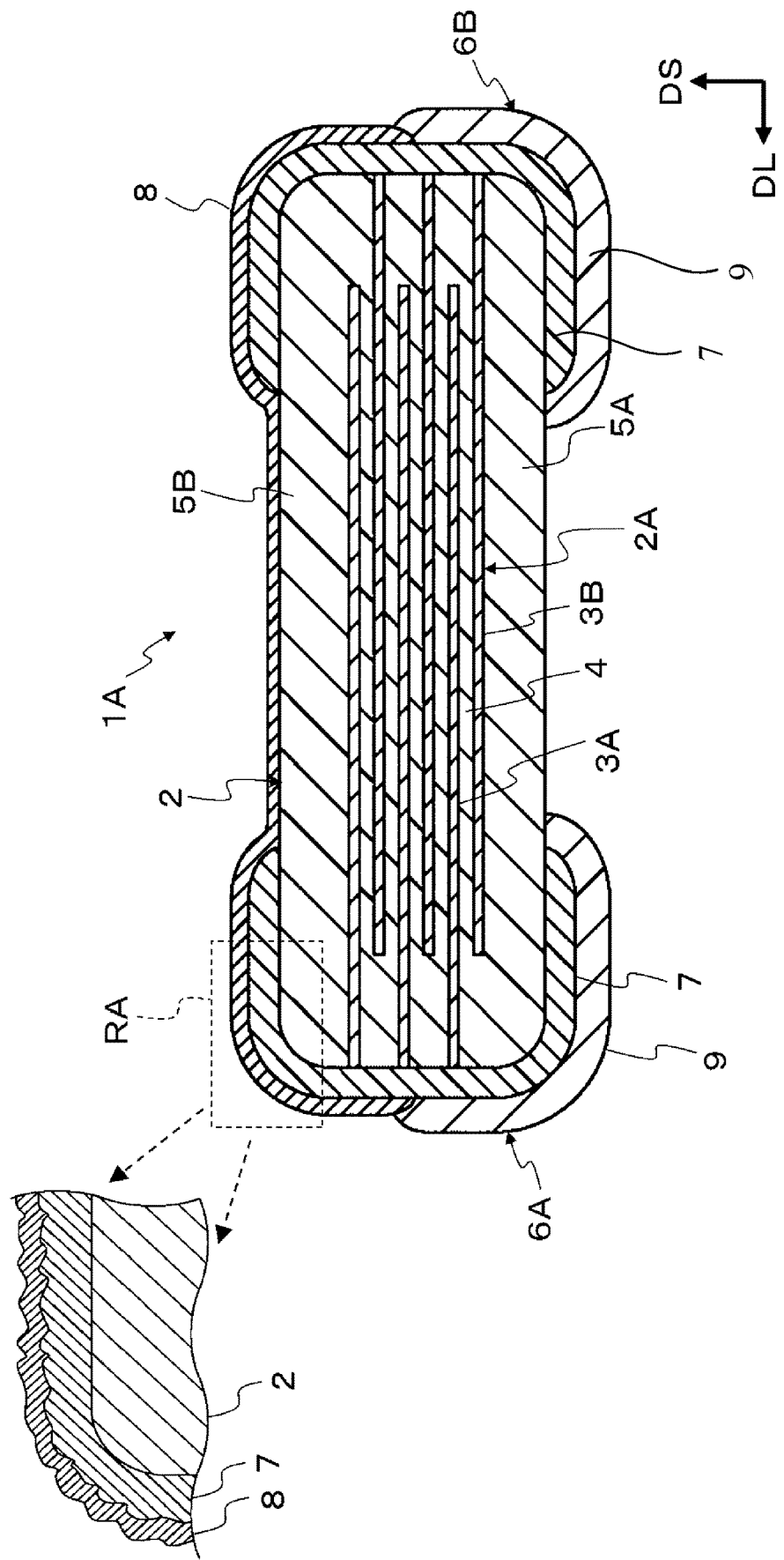
FIG. 2A is a cross-sectional view of the multilayer ceramic capacitor taken along line A1-A1 in FIG. 1.
Figure 2B:
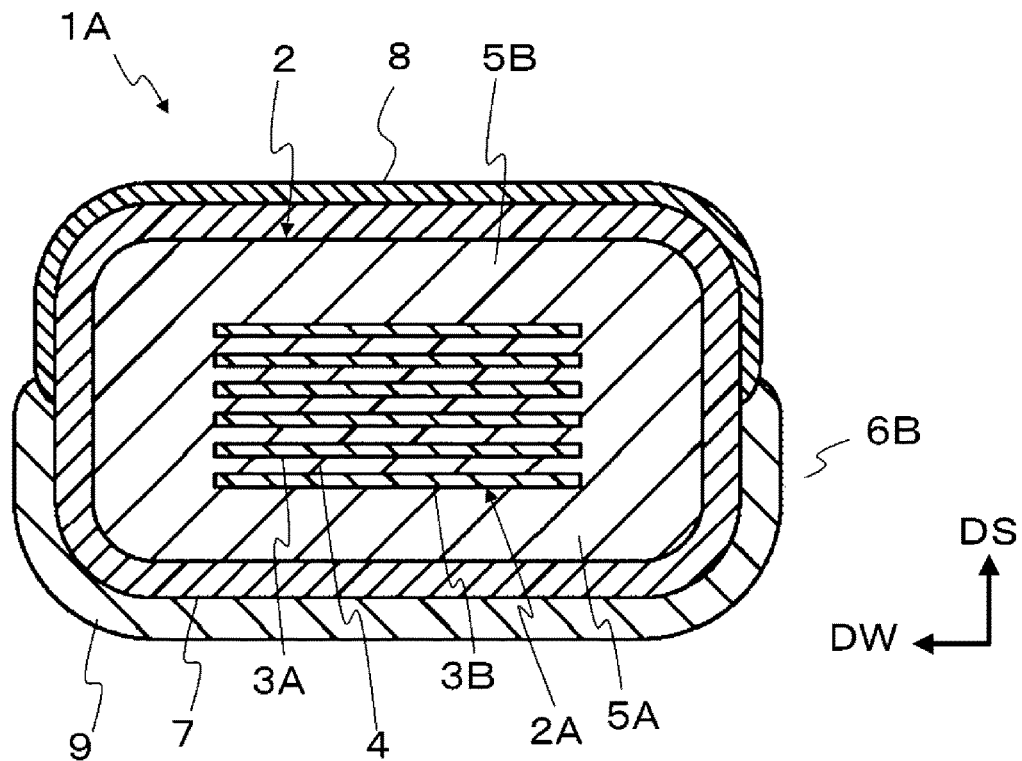
FIG. 2B is a cross-sectional view of the multilayer ceramic capacitor taken along line B1-B1 in FIG. 1.
Figure 2C:
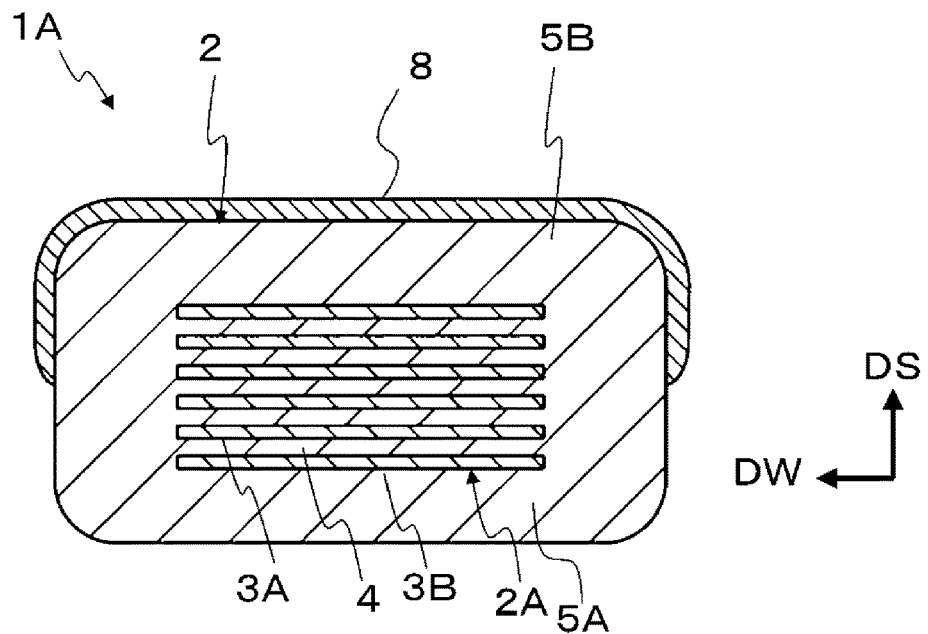
FIG. 2C is a cross-sectional view of the multilayer ceramic capacitor taken along line C1-C1 in FIG. 1.

FIG. 1 is a perspective view showing a multilayer ceramic capacitor according to a first embodiment of the present invention. FIG. 2A is a cross-sectional view of the multilayer ceramic capacitor taken along line A1-A1 in FIG. 1. FIG. 2B is a cross-sectional view of the multilayer ceramic capacitor taken along line B1-B1 in FIG. 1. FIG. 2C is a cross-sectional view of the multilayer ceramic capacitor taken along line C1-C1 in FIG. 1.

In this embodiment, a multilayer ceramic capacitor is taken as an example as a ceramic electronic component.

As shown in FIGS. 1 and 2A to 2C, the multilayer ceramic capacitor 1A includes an element body (element assembly) 2, external electrodes (outer electrodes) 6A and 6B, and an insulating layer 8. The element body 2 has a laminate (or stack) 2A, a lower cover layer 5A, and an upper cover layer 5B. The laminate 2A has internal electrode layers (inner electrode layers) 3A, other internal electrode layers 3B, and dielectric layers 4 interposed between neighboring internal electrode layers 3A and 3B.

The lowermost layer of the laminate 2A is covered with the lower cover layer 5A, and the uppermost layer of the laminate 2A is covered with the upper cover layer 5B. The internal electrode layers 3A and 3B are alternately stacked in such a manner that the dielectric layers 4 are interposed therebetween. Although FIGS. 1 and 2A to 2C show an example in which six internal electrode layers 3A and 3B are stacked in total, the number of stacked internal electrode layers 3A and 3B is not limited.

The shape of the element body 2 may be a substantially rectangular parallelepiped shape, and the shape of the laminate 2A may also be a substantially rectangular parallelepiped shape. The element body 2 may be chamfered along the respective edges of the element body 2.

The element body 2 has six surfaces: first to sixth surfaces.

In the following description, the direction perpendicularly passing through the two side surfaces (third and sixth surfaces) of the element body 2 may be referred to as a longitudinal direction DL, the direction perpendicularly passing through the front and rear surfaces (fourth and fifth surfaces) of the element body 2 may be referred to as a width direction DW, and the direction perpendicularly passing through the top and bottom surfaces (second and first surfaces) of the element body 2 may be referred to as a stacking direction (height direction) DS.

Four surfaces of the element body 2 (the lower surface (first surface), the upper surface (second face), front surface (fourth surface) and rear surface (fifth surface)) are perpendicular to the two side surfaces (third and sixth surfaces) of the element body 2. The first and second surfaces are opposite each other, and the fourth and fifth surfaces are opposite each other. The first surface will face the mounting surface of a mounting substrate on which the multilayer ceramic capacitor 1A is mounted.

The external electrodes 6A and 6B are located on opposite sides of the element body 2, respectively, so that the external electrodes 6A and 6B are spaced apart (separated) from each other. Each of the external electrodes 6A and 6B continuously covers the top surface, the side surface, and the bottom surface of the element body 2. Each of the external electrodes 6A and 6B may also cover the front surface and the rear surface of the element body 2. The lower surface of each of the external electrodes 6A and 6B will face the mounting substrate on which the multilayer ceramic capacitor 1A is mounted.

In the longitudinal direction DL, the internal electrode layers 3A and 3B are arranged alternately at different positions in the laminate 2A. The internal electrode layers 3A can be closer to the left side surface of the element body 2 than the internal electrode layers 3B, whereas the internal electrode layers 3B can be closer to the right side surface of the element body 2 than the internal electrode layers 3A. Left ends of the internal electrode layers 3A are exposed at the left ends of the dielectric layers 4 and at the left side surface in the longitudinal direction DL of the element body 2 and are connected to the external electrode 6A. Right ends of the internal electrode layers 3B are exposed at the right ends of the dielectric layers 4 and at the right side surface in the longitudinal direction DL of the element body 2 and are connected to the external electrode 6B.

On the other hand, in the width direction DW, ends of the internal electrode layers 3A and 3B are covered with the dielectric material that forms the dielectric layers 4. In the width direction DW, both ends of the internal electrode layers 3A may be aligned with both ends of the internal electrode layers 3B.

The thickness of each of the internal electrode layers 3A, the internal electrode layers 3B, and the dielectric layers 4 in the stacking direction DS may be in a range from 0.05 micrometers to five micrometers, for example, may be 0.3 micrometers.

The material of the internal electrode layers 3A and 3B may be a metal, for example, Cu (copper), Ni (nickel), Ti (titanium), Ag (silver), Au (gold), Pt (platinum), Pd (palladium), Ta (tantalum), or W (tungsten), or may be an alloy containing at least one of the metals.

The main component of the material of the dielectric layers 4 may be, for example, a ceramic material having a perovskite structure. The main component may be contained in a ratio of 50 at % or more. The ceramic material of the dielectric layers 4 may be, for example, barium titanate, strontium titanate, calcium titanate, magnesium titanate, barium strontium titanate, barium calcium titanate, calcium zirconate, barium zirconate, calcium titanate zirconate, or titanium oxide.

The main component of the material of the lower cover layer 5A and the upper cover layer 5B may be, for example, a ceramic material. The main component of the ceramic material of the lower cover layer 5A and the upper cover layer 5B may be the same as the main component of the ceramic material of the dielectric layers 4.

The thickness of each of the lower cover layer 5A and the upper cover layer 5B is preferably from 5 micrometers to 30 micrometers.

Each of the external electrodes 6A and 6B has a base layer 7 formed on the element body 2 and a plating layer 9 formed on the base layer 7.

Each of the base layers 7 is continuously formed so as to have an upper part formed on the upper surface of the element body 2, a lower part formed on the lower surface of the element body 2, a side part formed on a side surface of the element body 2, a front part formed on the front surface of the element body 2, and a rear part formed on the rear surface of the element body 2.

Each of the plating layer 9 is continuously formed so as to be placed on the lower part and a lower portion of the side part of one of the base layers 7. Each of the plating layer 9 may be continuously formed so as to be placed on a lower portion of the front part and a lower portion of the rear part of one of the base layers 7. Accordingly, the lower part, a lower portion of the side part, a lower portion of the front part, and a lower portion of the rear part of the base layer 7 are covered with the plating layer 9, but the upper part, an upper portion of the side part, an upper portion of the front part, and an upper portion of the rear part of the base layer 7 are not covered with the plating layer 9.

The lower part of each of the external electrodes 6A and 6B has a thickness of, for example, 10 to 40 micrometers.

The electrical conductive material of the base layer 7 may be a metal, for example, Cu, Fe (iron), Zn (zinc), Al (aluminum), Ni, Pt, Pd, Ag, Au, and Sn (tin), or may be an alloy containing at least one of the metals. The base layer 7 may further include co-material particles dispersed in the metal. Here, the term "particle" is meant to include not only an individual small particle, but also a block formed by a combination of multiple small particles after the sintering process, which will be described later.

The co-material dispersed like islands in the base layer 7 reduces the difference in thermal expansion coefficients of the element body 2 and the base layer 7 to alleviate thermal stress exerted in the base layer 7. The co-material is, for example, a ceramic component that is the main component of the material of the dielectric layers 4.

The base layer 7 may also include a glass component. The glass component in the base layer 7 can densify the base layer 7. The glass component may be, for example, an oxide of Ba (barium), Sr (strontium), Ca (calcium), Zn, Al, Si (silicon), B (boron), or the like.

The base layer 7 may contain a metal component contained in the element body 2. This metal component may be, for example, Mg (magnesium), and may contain a small amount of at least one of Ni, Cr, Sr, Al, Na, and Fe. More specifically, the base layer 7 may be a compound of the metal used as the conductive material of the base layer 7 and the metal and oxygen contained in the element body 2, for example, a compound containing Mg, Ni, and O.

The base layer 7 is preferably formed of a sintered coating film containing a dielectric material and the aforementioned materials. This facilitates making the base layer 7 thicker while ensuring the adhesiveness between the element body 2 and the base layer 7, which results in ensuring the strength of each external electrode 6A and 6B, and ensuring the conductivity of the base layer 7 with the internal electrode layers 3A and 3B.

As mentioned above, the lower part, a lower portion of the side part, a lower portion of the front part, and a lower portion of the rear part of the base layer 7 are covered with the plating layer 9, but the upper part, an upper portion of the side part, an upper portion of the front part, and an upper portion of the rear part of the base layer 7 are not covered with the plating layer 9. Each of the plating layers 9 is electrically connected with the internal electrode layer 3A or 3B via one of the base layers 7. In addition, each of the plating layers 9 is electrically connected with an electrode on a mounting substrate through solder. In order to ensure the strength of each of the external electrodes 6A and 6B and to ensure connection of the plating layers 9 with the base layers 7 and the terminals of the mounting substrate, it is preferable that the thickness of the plating layer 9 be 10 micrometers or more.

The main component of the material of the plating layer 9 may be a metal, for example, Cu, Ni, Al, Zn, Sn, or the like, or may be an alloy containing at least one of the metals. The plating layer 9 may be a single layer of a single metal component or multiple layers of different metal components.

Each of the plating layers 9 may have a three-layered structure consisting of, for example, a Cu plating layer formed on the base layer 7, a Ni plating layer formed on the Cu plating layer, and a Sn plating layer formed on the Ni plating layer. The Cu plating layer can improve the adhesiveness of the plating layer 9 to the base layer 7, and the Ni plating layer can improve the heat resistance of the external electrode 6A and 6B during soldering. The Sn plating layer can improve the wettability of the solder for the plating layer 9.

An insulating layer 8 is formed on the upper surface (on the opposite side of the mounting surface) of the element body 2. The thickness of the insulating layer 8 is less than that of the plating layer 9.

The insulating layer 8 is formed continuously to be placed on the upper surface of the element body 2 and on the upper parts, the side parts the front parts, and the rear parts of the base layers 7 of the external electrodes 6A and 6B. Each of the side parts of the insulating layer 8 may have a varying thickness that gradually decreases downward.

On the other hand, each of the plating layers 9 is formed on the lower part, the side part, the front part, and the rear part of one of the base layers 7. The boundary between the insulating layer 8 and the plating layer 9 is located on the side part, the front part, and the rear part of the base layer 7.

Each of the side part, the front part, and the rear part of the insulating layer 8 has a lower edge (corresponding to the boundary between the insulating layer 8 and the plating layer 9). The lower edge is located between the top surface and the bottom surface of the element body 2 and is located preferably distant at least 10 micrometers from the top surface of the element body 2.

Each of the plating layer 9 covers and is in contact with the lower edge of the insulating layer 8 on the side part, the front part, and the rear part of the base layer 7. The lower edge of the insulating layer 8 may be pinched between the base layer 7 and the plating layer 9.

The insulating layer 8 may be formed continuously to be placed on not only the upper surface of the element body 2, but also on the front surface and the rear surface of the element body 2 and on the upper parts, the side parts, the front parts, and the rear parts of the base layers 7 of the external electrodes 6A and 6B. Each of the plating layers 9 may be formed on the lower part, the side part, the front part, and the rear part of one of the base layers 7 and is in contact with the insulating layer 8 on the side part, the front part, and the rear part of the base layer 7.

The insulating layers 8 may be composed of a deposition film. The insulating layers 8 may be formed by CVD (Chemical Vapor Deposition), other vapor depositions, sputtering, or ALD (Atomic Layer Deposition). The insulating layers 8 may be formed such that each of the side parts of the insulating layer 8 may have a varying thickness that gradually decreases downward. Preferably, the insulating layers 8 have a Vickers hardness greater than that of the element body 2, which is preferably 1.1 times or more than the Vickers hardness of the element body 2. It is preferable that each of the insulating layers 8 is an oxide film of Al or an oxide film of Zr. More specifically, in a case in which $BaTiO_3$ is used as the ceramic component of the element body 2, it is preferable to use $Al_2O_3$ or $ZrO_2$, of which the thermal expansion coefficient is close to that of $BaTiO_3$, as the material of the insulating layer 8. For example, the coefficient of thermal expansion of $BaTiO_3$ is about $10 \times 10^{-6}$/K. $Al_2O_3$ has a coefficient of thermal expansion of about $8 \times 10^{-6}$/K, and $ZrO_2$ has a coefficient of thermal expansion of $ZrO_2$ is about $10 \times 10^{-6}$/K. Using $Al_2O_3$ or $ZrO_2$ as the material for insulating layers 8 can minimize peeling of the insulating layers 8 from the element body 2 in thermal cycles such as during solder reflow.

Alternatively, the insulating layer 8 may be at least one of a metal oxide film such as $SiO_2$, a nitride film such as $Si_3N_4$ or nitride film such as AlN, a diamond film, and a diamond-like carbon film.

The thickness of the insulating layer 8 is preferably from 0.01 micrometers to five micrometers. As shown in the enlarged view of area RA in FIG. 2A, the insulating layer 8 is preferably a conformal film that has unevenness similar to that of the surface of the base layer 7. This allows the contact area between the insulating layer 8 and the base layer 7 to be increased, and the adhesiveness between the insulating layer 8 and the base layer 7 to be improved.

The external dimensions of an example of the multilayer ceramic capacitor 1A may be as follows: the length>the width>the height, or the length>the width=the height. To reduce the height of the multilayer ceramic capacitor 1A, the height of the multilayer ceramic capacitor 1A is preferably 150 micrometers or less. The height of the multilayer ceramic capacitor 1A can be referred to as the thickness of the multilayer ceramic capacitor 1A (the distance from the lower surfaces of the external electrodes 6A and 6B to the upper surface of the insulating layer 8).

In addition, by forming the insulating layer 8 on the upper parts and the upper portions of the side parts of the base layer 7, it is possible to prevent the plating layer 9 from being formed on the upper parts and the upper portions of the side parts of the base layer 7. Accordingly, when the multilayer ceramic capacitor 1A is mounted to a substrate with use of solder, it is possible to prevent solder from wetting up to protrude beyond the upper surface of the multilayer ceramic capacitor 1A through the plating layer 9. This makes it possible to prevent the height of the multilayer ceramic capacitor 1A from increasing after mounting on the substrate.

In addition, since the thickness of the insulating layer 8 is less than the thickness of the plating layer 9, the height of the multilayer ceramic capacitor 1A can be made lower.

In addition, by making the thickness of the insulating layer 8 in a range from 0.01 micrometer to five micrometers, it is possible to ensure the continuity of the insulating layer 8 while preventing the increase in the height of the multilayer ceramic capacitor 1A. Accordingly, when the multilayer ceramic capacitor 1A is mounted to a substrate with use of solder, it is possible to prevent solder from wetting up to the upper surface of the multilayer ceramic capacitor 1A through the plating layer 9. This makes it possible to prevent the height of the multilayer ceramic capacitor 1A from increasing after mounting on the substrate.

In addition, by making the insulating layer 8 by deposition, it is possible to make the insulating layer 8 thinner while ensuring the homogeneity of the film quality of the insulating layer 8.

In addition, since the boundary between the insulating layer 8 and the plating layer 9 is located on the side part of the base layer 7 between the top surface and the bottom surface of the element body 2, it is possible to limit the area not covered with the solder layers when mounting the multilayer ceramic capacitor 1A to a mounting substrate. In this way, it is possible to improve the adhesion strength of the external electrodes 6A and 6B to the mounting substrate.

In addition, since the lower edge of the insulating layer 8 (corresponding to the boundary between the insulating layer 8 and the plating layer 9) on the side surface, the front surface, and the rear surface of the base layer 7 is distant at least 10 micrometers from the top surface of the element body 2, even if solder wets up the side surface of the external electrodes 6A and 6B when the multilayer ceramic capacitor 1A is mounted to a mounting substrate, it is possible to prevent the solder from protruding beyond the top surface of the insulating layer 8. This makes it possible to prevent the height of the multilayer ceramic capacitor 1A from increasing after mounting on the substrate.

In addition, by setting the height of the multilayer ceramic capacitor 1A to 150 micrometers or less, the height of the multilayer ceramic capacitor 1A can be made less than the diameter of solder balls, which will be described later. Accordingly, a mounting substrate on which the multilayer ceramic capacitor 1A is mounted can be bonded to another substrate, e.g., a mother board via solder balls in such a manner that the multilayer ceramic capacitor 1A is interposed between the two substrates. As a result, a semiconductor chip can be mounted on the surface of the mounting substrate opposite to the surface on which the multilayer ceramic capacitor 1A is mounted, so that the multilayer ceramic capacitor 1A can be arranged in close proximity to the semiconductor chip, thereby effectively eliminating noise affecting the semiconductor chip.

In addition, the bending strength of the multilayer ceramic capacitor 1A can be increased since the Vickers hardness of the insulating layer 8 is greater than the that of the element body 2. Therefore, while reducing the height of the multilayer ceramic capacitor 1A, the bending strength can be improved to reduce cracking of the multilayer ceramic capacitor 1A during mounting.

Figure 3:
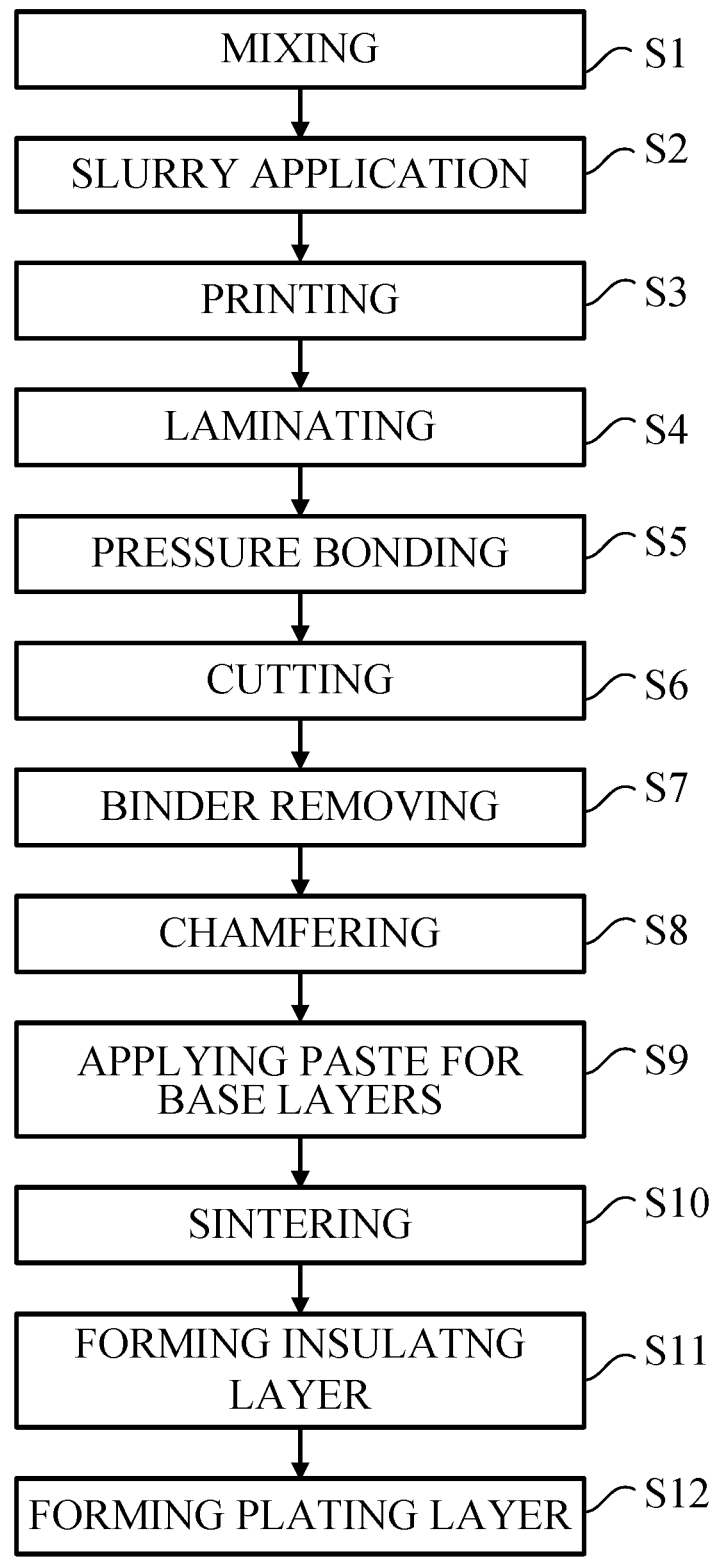
FIG. 3 is a flowchart showing a method of manufacturing a multilayer ceramic capacitor according to the first embodiment.

FIG. 3 is a flowchart showing an example of a method of manufacturing a multilayer ceramic capacitor according to the first embodiment. FIGS. 4A to 4J are cross-sectional views showing an exemplary method of manufacturing the multilayer ceramic capacitor according to the first embodiment. For the sake of illustration, FIG. 4C to FIG. 4J show only three internal electrode layers 3A and three internal electrode layers 3B laminated alternately in such a manner that the dielectric layers 4 are interposed therebetween.

In Step S1 of FIG. 3 (mixing step), an organic binder and an organic solvent, as a dispersant and a forming aid, are added to a dielectric material powder, and pulverized and mixed to produce a muddy slurry. The dielectric material powder includes, for example, a ceramic powder. The dielectric material powder may include an additive or additives. The additive(s) may be, for example, Mg, Mn, V, Cr, Y, Sm, Eu, Gd, Tb, Dy, Ho, Er, Tm, Yb, Co, Ni, Li, B, Na, K or Si oxide, or glass. The organic binder is, for example, a polyvinyl butyral resin or a polyvinyl acetal resin. The organic solvent is, for example, ethanol or toluene.

Figure 4A:
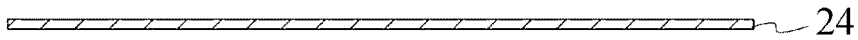
FIGS. 4A to 4J are cross-sectional views used for describing the method of manufacturing the multilayer ceramic capacitor according to the first embodiment.

Next, in Step S2 of FIG. 3 (slurry application step), as shown in FIG. 4A, a green sheet 24 is manufactured. Specifically, the slurry containing the ceramic powder is applied onto a carrier film in a sheet form and dried to manufacture the green sheet 24. The carrier film is, for example, a PET (polyethylene terephthalate) film. The application of the slurry can be conducted with the use of, for example, a doctor blade method, a die coater method, or a gravure coater method. Step S2 is repeated to prepare a plurality of green sheets 24.

Figure 4B:
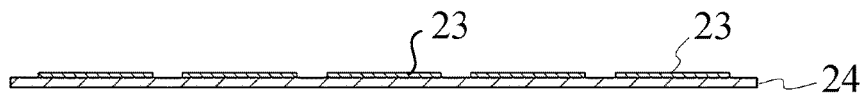

Next, in Step S3 of FIG. 3 (printing step), as shown in FIG. 4B, a conductive paste, which will become an internal electrode layer, is applied in a predetermined pattern onto each of the green sheets 24, on which internal electrode layers 3A or 3B shown in FIG. 1 are to be placed, among the green sheets prepared in Step S1 to form internal electrode patterns 23 on the green sheets 24. In Step S3, it is possible to form a plurality of internal electrode patterns 23 on each single green sheet 24 such that the internal electrode patterns 23 are separated from each other in the longitudinal direction of the green sheet 24.

The conductive paste for the internal electrode layers includes a powder of the metal used as the material of the internal electrode layers 3A and 3B. For example, if the metal used as the material of the internal electrode layers 3A and 3B is Ni, the conductive paste for the internal electrode layers includes a powder of Ni. The conductive paste for the internal electrode layers also includes a binder, a solvent, and, if necessary, an auxiliary agent. The conductive paste for the internal electrode layers may include, as a co-material, a ceramic material having a main component that has the same composition as that of the main component of the material of the dielectric layers 4.

The application of the conductive paste for the internal electrode layers may be conducted with the use of a screen-printing method, an inkjet printing method, or a gravure printing method. Thus, Step S3 may be referred to as a printing step. In this manner, a plurality of green sheets 24 that have the internal electrode patterns 23 thereon are prepared.

Figure 4C:
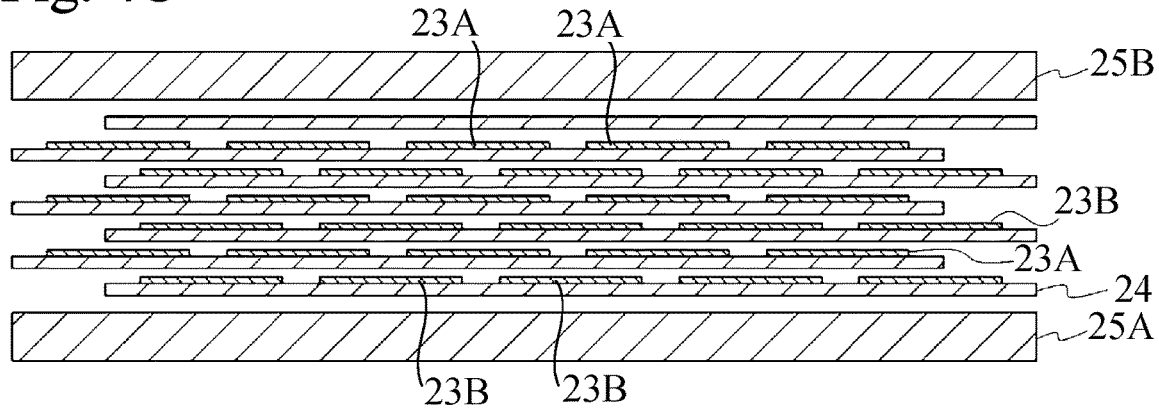

Next, in Step S4 of FIG. 3 (laminating step), as shown in FIG. 4C, the green sheets 24 on which the internal electrode patterns 23 are formed and the green sheets 25A and 25B on which the internal electrode patterns 23 are not formed are laminated in a predetermined order to create a block 30 of the green sheets. The green sheets 25A and 25B on which the internal electrode patterns 23 are not formed are used as the outer layers (the lower cover layer 5A and the upper cover layer 5B). The green sheets 25A and 25B are thicker than the green sheets 24.

The green sheets 24 having the internal electrode patterns 23A or 23B thereon are classified into two groups, i.e., the green sheets 24 having the internal electrode patterns 23A (which will form the internal electrode layer 3A) thereon and the green sheets 24 having the internal electrode patterns 23B (which will form the internal electrode layer 3B) thereon. The green sheets 24 having the internal electrode patterns 23A thereon and the green sheets 24 having the internal electrode patterns 23B thereon are stacked alternately in the laminating direction such that the internal electrode patterns 23A on the green sheet 24 and the internal electrode patterns 23B on the next or adjacent green sheet 24 are alternately shifted in the longitudinal direction of the green sheet 24.

Furthermore, three types of portions are defined in the green sheet block 30. Specifically, the green sheet block 30 includes a portion in which only the internal electrode patterns 23A are stacked in the stacking direction, a portion in which the internal electrode patterns 23A and 23B are stacked alternately in the stacking direction, and a portion in which only the internal electrode patterns 23B are stacked in the stacking direction.

Figure 4D:
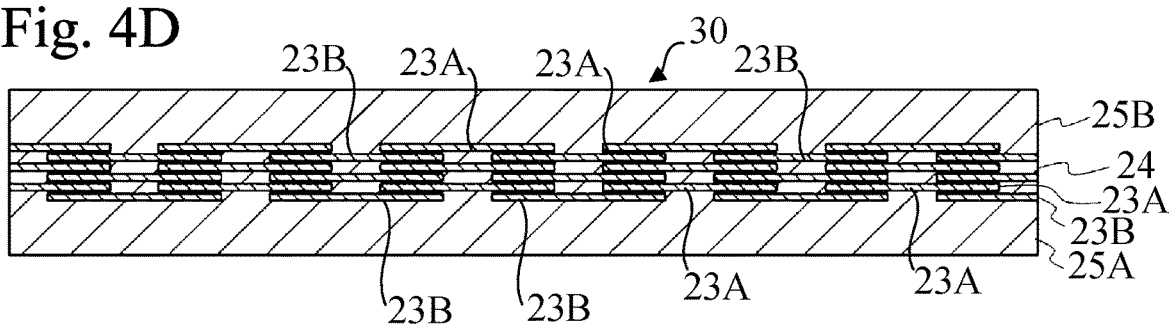

Next, in Step S5 of FIG. 3 (pressure bonding step), as shown in FIG. 4D, the laminate block 30 obtained in the laminating step of Step S4 of FIG. 3 is pressed such that the green sheets 24, 25A, and 25B are pressure-bonded. Pressing the laminate block 30 may be conducted by, for example, hydrostatically pressing the laminate block 30, which may be surrounded by a resin film.

Figure 4E:
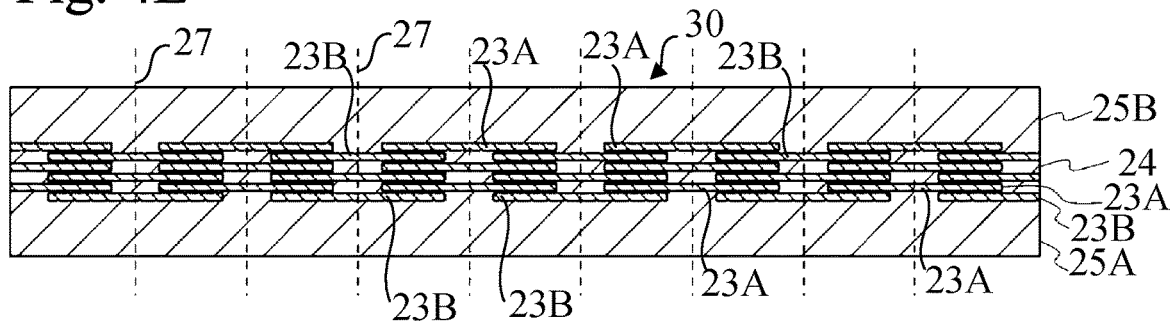

In Step S6 of FIG. 3 (cutting step), as shown in FIG. 4E, the pressed laminate block 30 is cut such that the block 30 is separated into a plurality of element bodies, each of which has a rectangular parallelepiped shape. Each element body has six surfaces. The cutting of the laminate block 30 is conducted at the portions in which only the internal electrode patterns 23A are stacked in the stacking direction, and the portions in which only the internal electrode patterns 23B are stacked in the stacking direction, as indicated by a plurality of vertical broken lines 27. The cutting of the laminate block 30 may be conducted by, for example, blade dicing or a similar method.

Figure 4F:
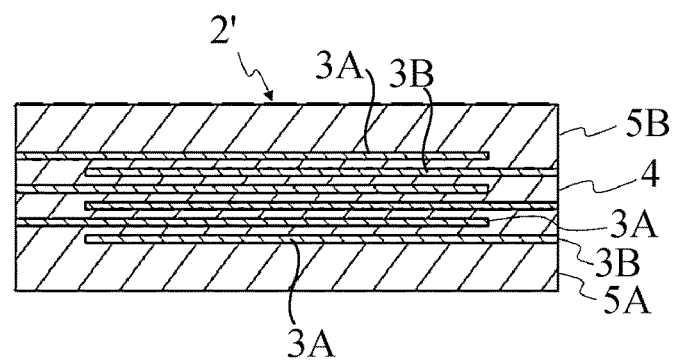

The resulting element body 2' is shown in an enlarged manner in FIG. 4F. As illustrated in FIG. 4F, the internal electrode layers 3A and 3B are alternately laminated in such a manner that the dielectric layers 4 are interposed therebetween in each of the individual element bodies 2'. The internal electrode layers 3A are exposed on one side surface of each element body 2', and the internal electrode layers 3B are exposed on the other side surface of each element body 2'.

The lower cover layer 5A and the upper cover layer 5B are formed in each element body 2'.

Next, in Step S7 of FIG. 3 (binder removing step), the binder contained in each of the element bodies 2' separated in Step S6 of FIG. 3 is removed. The removal of the binder is conducted by, for example, heating the element bodies 2' in an $N_2$ atmosphere at about 350 degrees Celsius.

Figure 4G:
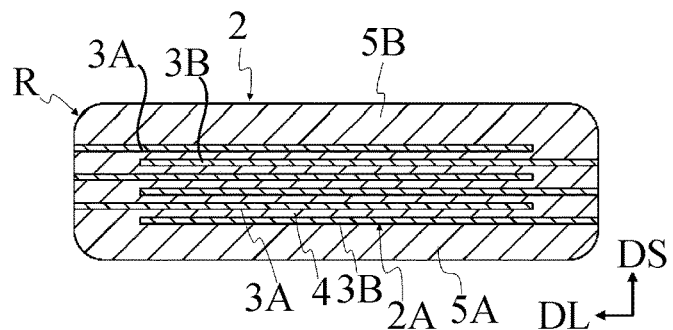

Next, in Step S8 of FIG. 3 (chamfering step), as shown in FIG. 4G, corners of each element body 2' are chamfered, so that the element body 2 having curved surfaces R at corners are formed. For example, barrel polishing can be used for chamfering the element bodies 2'.

Next, in Step S9 of FIG. 3 (step of applying a paste for the base layers), a conductive paste for the base layers (underlayers) 7 is applied to both side surfaces of each element body 2 and is applied to the remaining four surfaces (upper, lower, front, and rear surfaces) of the element body 2, which are adjacent to the respective side surfaces. For example, a dipping method can be used to apply the conductive paste for the base layers. Then, the conductive paste is dried.

The conductive paste for the base layers 7 includes a powder or filler of the metal used as the conductive material of the base layers 7. For example, when the metal used as the conductive material of the base layers 7 is Ni, the conductive paste for the base layers includes a powder or filler of Ni. The conductive paste for the base layers also includes, as the co-material, a ceramic component, which is the main component of the material of the dielectric layers 4, for example. Particles of oxide ceramics mainly composed of barium titanate (e.g., 0.8 micrometers to 4 micrometers in D50 particle diameter), for example, are mixed in the conductive paste for the base layers, as the co-material. The conductive paste for the base layers further includes a binder and a solvent.

Figure 4H:
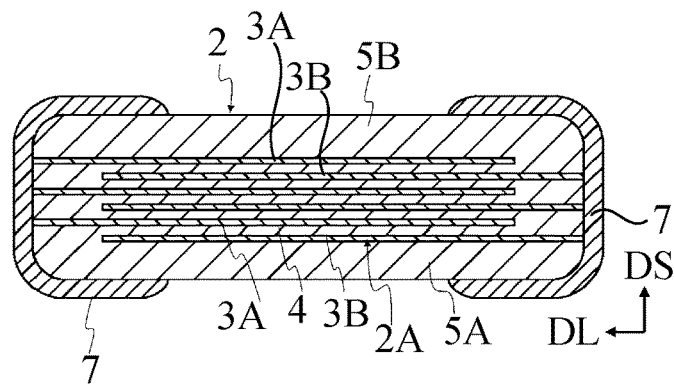

Next, in Step S10 of FIG. 3 (sintering step), as shown in FIG. 4H, the element bodies 2, on which the conductive paste for the base layers 7 was applied in Step S9 of FIG. 3, undergo the sintering process such that the internal electrode layers 3A and 3B are integrated with the dielectric layers 4 in each element body 2 and the base layers 7 are integrated with the element body 2. The sintering of the element bodies 2 and the conductive paste is conducted in, for example, a sintering furnace in a temperature range from 1000 degrees Celsius to 1400 degrees Celsius for ten minutes to two hours.

If a base metal such as Ni or Cu is used as the material of the internal electrode layers 3A and 3B, the sintering process may be conducted in the sintering furnace while the interior of the sintering furnace is kept to a reducing atmosphere in order to prevent oxidation of the internal electrode layers 3A and 3B.

After sintering, the unit of the element body 2 and the base layers 7 has a length of, e.g., 1.0 millimeters, a width of, e.g., 0.5 millimeters, and a height of, e.g., 0.06 millimeters.

Figure 4I:
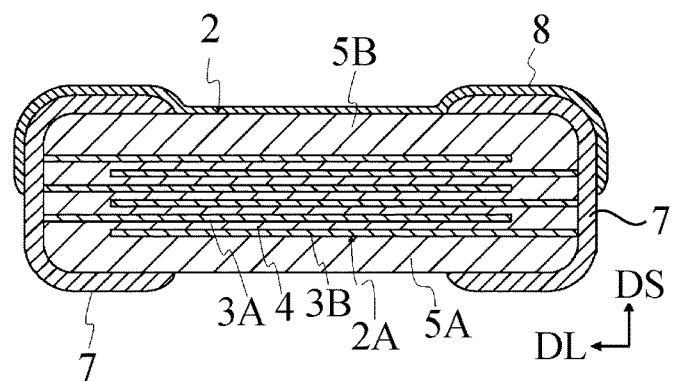

Next, in Step S11 of FIG. 3 (step of forming the insulating layer), as shown in FIG. 4I, the insulating layer 8 is deposited on the element body 2 and the base layer 7 by a method such as CVD. For example, the insulating layer 8 may be made from $Si_3N_4$, and the thickness of the insulating layer 8 may be one micrometer. The insulating layer 8 covers the side surfaces, the front surface, and the rear surface of the base layers 7. The lower edge of the insulating layer 8 is 50 micrometers below the top surface of the base layers 7. In order to prevent the lower portions of the base layers 7, which are at least 50 micrometers below the top surface of the base layer 7, from being covered with the insulating layer 8, when the insulating layer 8 is deposited, the lower portions may be covered with one or more masks.

Figure 4J:
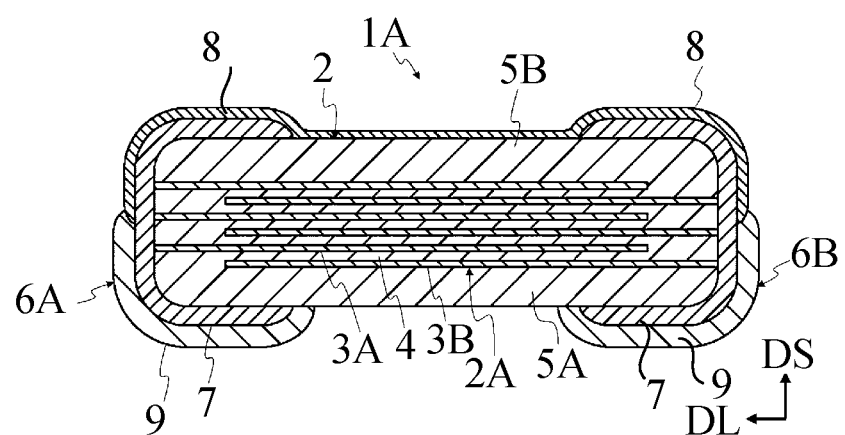

Next, in Step S12 of FIG. 3 (step of forming the plating layers), as shown in FIG. 4J, the plating layers 9 are formed on the base layers 7 exposed from the insulating layer 8. In forming the plating layer 9, for example, the Cu plating layer, the Ni plating layer, and the Sn plating layer may be formed sequentially. In this case, the plating layers can be formed by that the element body 2, on which the base layers 7 and the insulating layer 8 are formed, is housed in a barrel and immersed in a plating solution in the barrel, and the barrel is rotated and energized. Since there is the insulating layer 8 on the upper surfaces of the base layers 7, the plating layers 9 are not formed on the upper surfaces of the base layers 7. The thicknesses of the Cu plating layer, the Ni plating layer, and the Sn plating layer can be, for example, three micrometers, two micrometers, and five micrometers, respectively.

Second Embodiment

Figure 5:
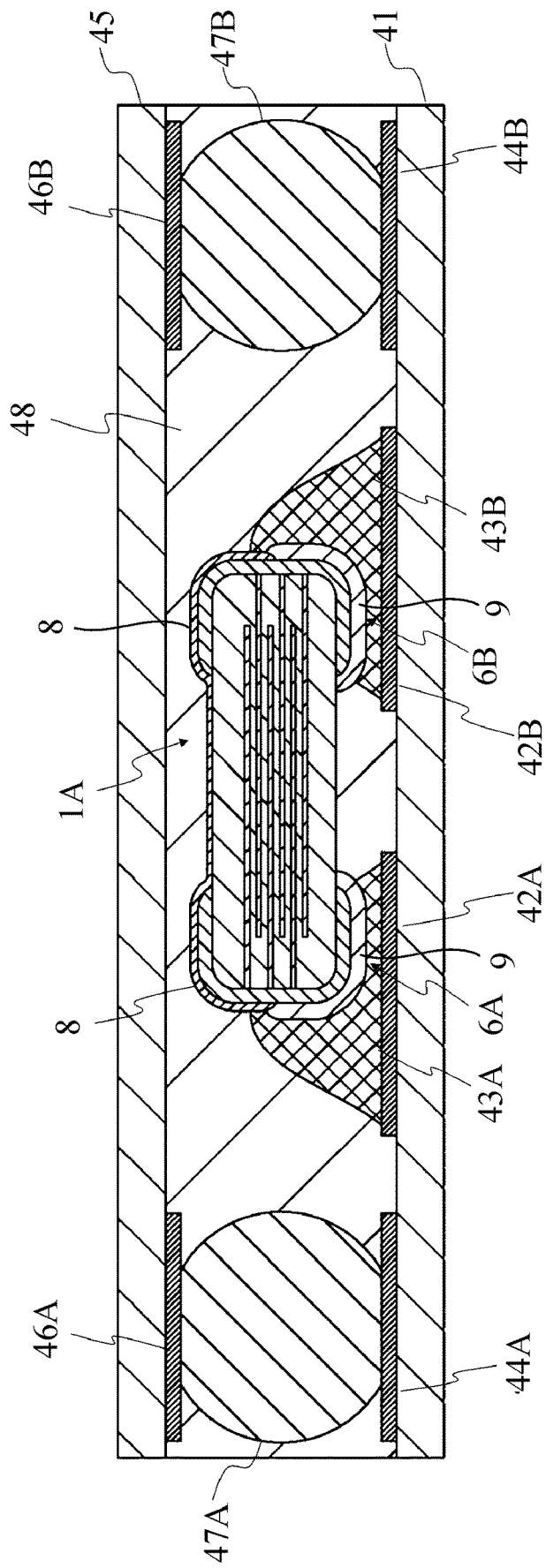
FIG. 5 is a cross-sectional view showing an arrangement according to a second embodiment of the present invention in which the multilayer ceramic capacitor is mounted on a mounting substrate.

FIG. 5 is a cross-sectional view showing an arrangement according to a second embodiment of the present invention, in which the multilayer ceramic capacitor 1A is mounted on a mounting substrate 41.

As shown in FIG. 5, land electrodes 42A, 42B, 44A, and 44B are formed on the reverse surface of the mounting substrate 41. The multilayer ceramic capacitor 1A is connected to the land electrodes 42A and 42B via solder layers 43A and 43B attached to the plating layers 9 of the external electrodes 6A and 6B, respectively.

In the process of soldering, each of the solder layers 43A and 43B wets up the side surface of the external electrodes 6A and 6B, but is positioned below the upper surface of the insulating layer 8.

Solder balls 47A and 47B are formed on the land electrodes 44A and 44B, respectively on the reverse surface of the mounting substrate 41.

On the other hand, a semiconductor chip, which is not shown, is mounted on the obverse surface of the mounting substrate 41. The semiconductor chip may be a microprocessor, a semiconductor memory, or an FPGA (Field-Programmable Gate Array), or an ASIC (Application Specific Integrated Circuit).

Land electrodes 46A and 46B are formed on the reverse surface of another mounting substrate 45. The mounting substrates 41 and 45 are connected to each other via solder balls 47A and 47B. The mounting substrate 45 can be used as a mother board on which the mounting substrate 41 is mounted.

The interval between the mounting substrates 41 and 45 is maintained constant by the solder balls 47A and 47B. In addition, a sealing resin 48 that encapsulates the multilayer ceramic capacitor 1A is filled in the space between the mounting substrates 41 and 45. The sealing resin 48 is, for example, an epoxy resin. After the mounting substrates 41 and 45 are connected to each other via the solder balls 47A and 47B, the resin 48 may be filled in the space between the mounting substrates 41 and 45 and cured. In this case, the sealing resin 48 covers the multilayer ceramic capacitor 1A, the solder layers 43A and 43B, and the solder balls 47A and 47B, and adheres to the insulating layer 8.

By mounting the multilayer ceramic capacitor 1A on the reverse surface of the mounting substrate 41, which is opposite to the obverse surface on which the semiconductor chip is mounted, the multilayer ceramic capacitor 1A can be arranged in close proximity to the semiconductor chip, thereby effectively eliminating noise affecting the semiconductor chip.

In addition, by setting the height of the multilayer ceramic capacitor 1A to 150 micrometers or less, the multilayer ceramic capacitor 1A can be interposed between the two mounting substrates 41 and 45 connected to each other via the solder balls 47A and 47B. As a result, a semiconductor chip can be mounted on the reverse surface of the mounting substrate 41 opposite to the obverse surface on which the multilayer ceramic capacitor 1A is mounted.

In addition, by forming the insulating layer 8 on the upper parts and the upper portions of the side parts of the base layer 7, it is possible to prevent the plating layer 9 from being formed on the upper parts and the upper portions of the side parts of the base layer 7. Accordingly, when the multilayer ceramic capacitor 1A is mounted to the substrate 41 with use of the solder layers 43A and 43B, it is possible to prevent solder from wetting up to protrude beyond the upper surface of the multilayer ceramic capacitor 1A through the plating layer 9. This makes it possible to arrange the multilayer ceramic capacitor 1A in the space between the mounting substrates 41 and 45, which are connected to each other via the solder balls 47A and 47B.

In addition, by making the thickness of the insulating layer 8 in a range from 0.01 micrometers to five micrometers, it is possible to reduce the height of the ceramic capacitor 1A without reducing the thickness of the element body 2, thereby minimizing a decrease in the capacitance of the multilayer ceramic capacitor 1A. In addition, when the multilayer ceramic capacitor 1A is mounted to the substrate 41 with use of the solder layers 43A and 43B, it is possible to prevent solder from wetting up to protrude beyond the upper surface of the insulating layer 8 through the plating layer 9.

Third Embodiment

FIG. 6A is a cross-sectional view of a multilayer ceramic capacitor according to a third embodiment of the present invention taken in the same manner as in FIG. 2A. FIG. 6A is a cross-sectional view of the multilayer ceramic capacitor according to the third embodiment taken in the same manner as in FIG. 2B. FIG. 6C is a cross-sectional view of the multilayer ceramic capacitor according to the third embodiment taken in the same manner as in FIG. 2C.

Figure 6B:
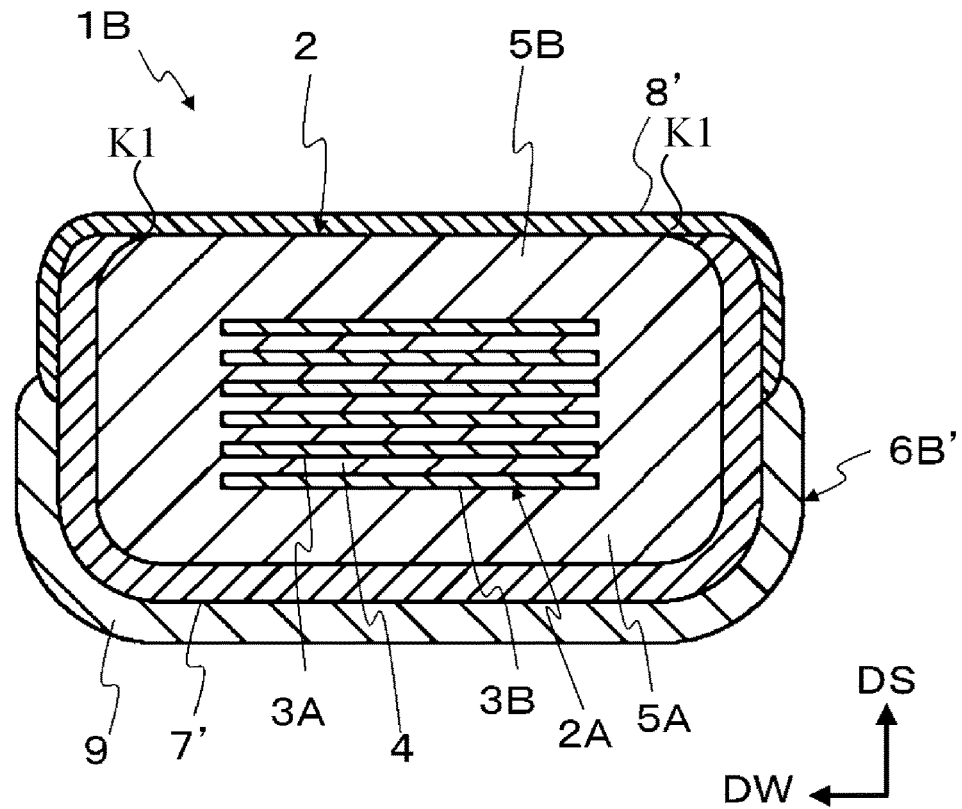
FIG. 6B is a cross-sectional view of the multilayer ceramic capacitor according to the third embodiment taken in the same manner as in FIG. 2B.
Figure 6C:
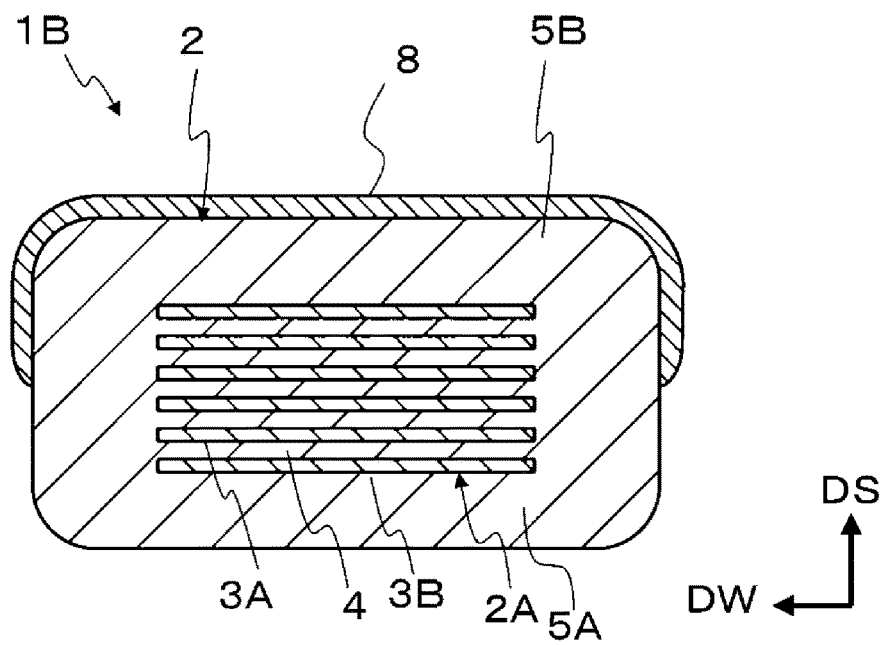
FIG. 6C is a cross-sectional view of the multilayer ceramic capacitor according to the third embodiment taken in the same manner as in FIG. 2C.

As shown in FIGS. 6A to 6C, the multilayer ceramic capacitor 1B has the element body 2, external electrodes 6A' and 6B', and an insulating layer 8'. Each of the external electrode 6A' and 6B' has a base layer 7' formed on the element body 2 and a plating layer 9 formed on the base layer 7'.

The external electrode 6A' and 6B' are different from the external electrodes 6A and 6B of FIG. 2A in that the base layers 7' in the external electrodes 6A' and 6B' are not formed on the upper surface of the element body 2, whereas the base layers 7 in the external electrodes 6A and 6B are formed on the upper surface of the element body 2. The insulating layer 8' is formed on the entirety of the upper surface of the element body 2.

To prevent the base layer 7' from being formed on the element body 2, the base layer 7 on the upper surface of the element body 2 in FIG. 2A may be removed by anisotropic etching or by mechanical grinding.

Other features of the base layers 7' and the insulating layer 8' can be the same as the base layers 7 and the insulating layer 8 of FIG. 2A.

Since the base layer 7' of each of the external electrode 6A' and 6B' is not formed on the upper surface of the element body 2, the height of the multilayer ceramic capacitor 1B can be reduced by the thickness of the base layer 7', thereby reducing the height of the multilayer ceramic capacitor 1B.

When the plating layers 9 are formed by electrolytic plating, hydrogen is generated and the element body 2 and the base layer 7' are exposed to the hydrogen. Hydrogen may penetrate into the laminate 2A through the interface between the element body 2 and the base layer 7', making the laminate 2A fragile and deteriorating the insulation of the insulating layers 8. The penetration of hydrogen into the laminate 2A starts at end points K1 and K2 of the interface between the element body 2 and the base layer 7'.

If the base layer 7' is not formed on the upper surface of the element body 2, hydrogen will penetrate into the laminate 2A easily from the end points K1.

By forming an insulating layer 8 so as to cover the top surface of the element body 2 and the tops and the side surfaces, the front surfaces, and the rear surfaces of the base layers 7', hydrogen is blocked from entering the laminate 2A. Accordingly, degradation of the insulation of the laminate 2A can be minimized.

Fourth Embodiment

Figure 7A:
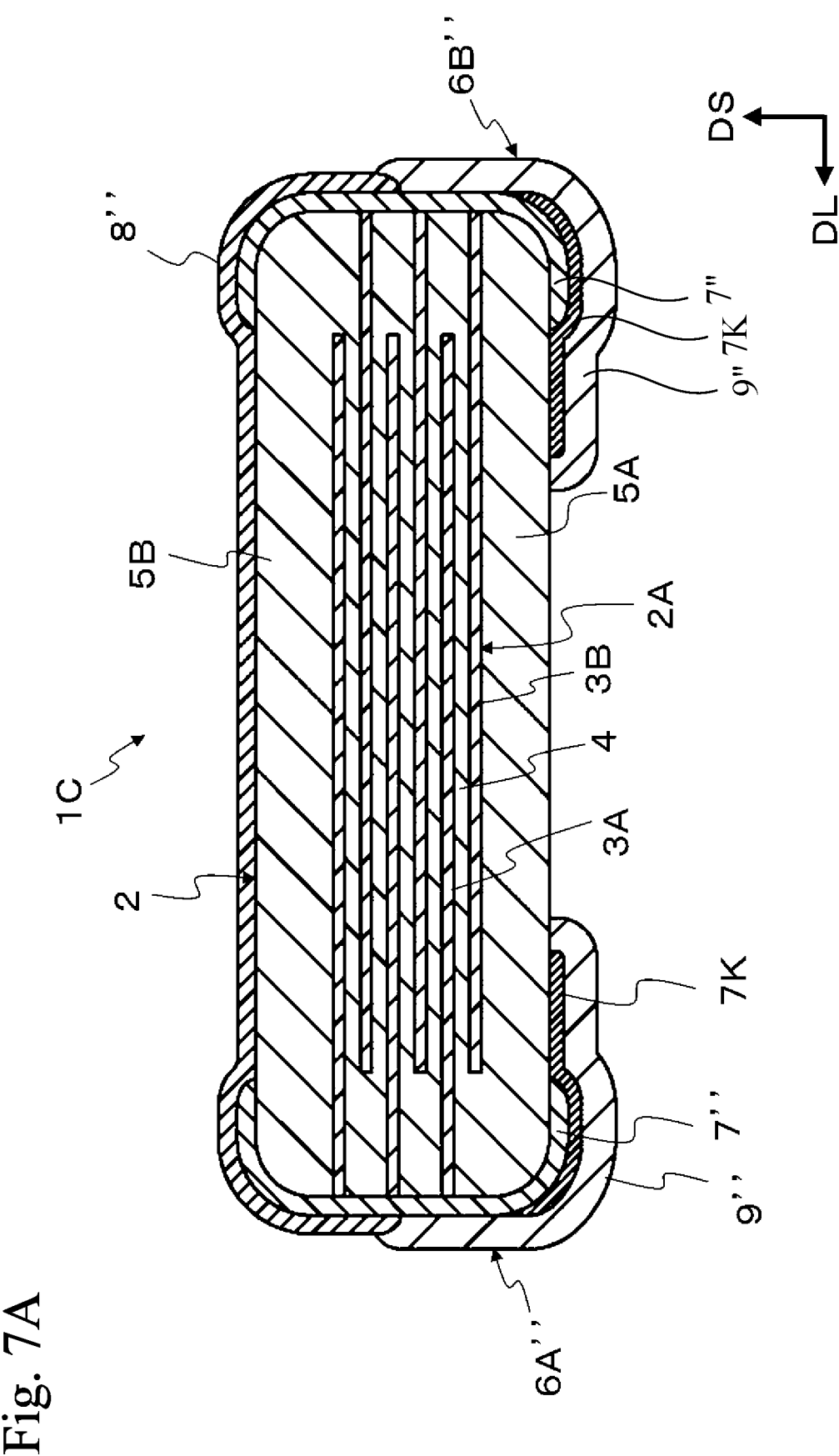
FIG. 7A is a cross-sectional view of a multilayer ceramic capacitor according to a fourth embodiment of the present invention taken in the same manner as in FIG. 2A.

FIG. 7A is a cross-sectional view of a multilayer ceramic capacitor according to a fourth embodiment of the present invention taken in the same manner as in FIG. 2A. FIG. 7A is a cross-sectional view of the multilayer ceramic capacitor according to the fourth embodiment taken in the same manner as in FIG. 2B. FIG. 7C is a cross-sectional view of the multilayer ceramic capacitor according to the fourth embodiment taken in the same manner as in FIG. 2C.

Figure 7B:
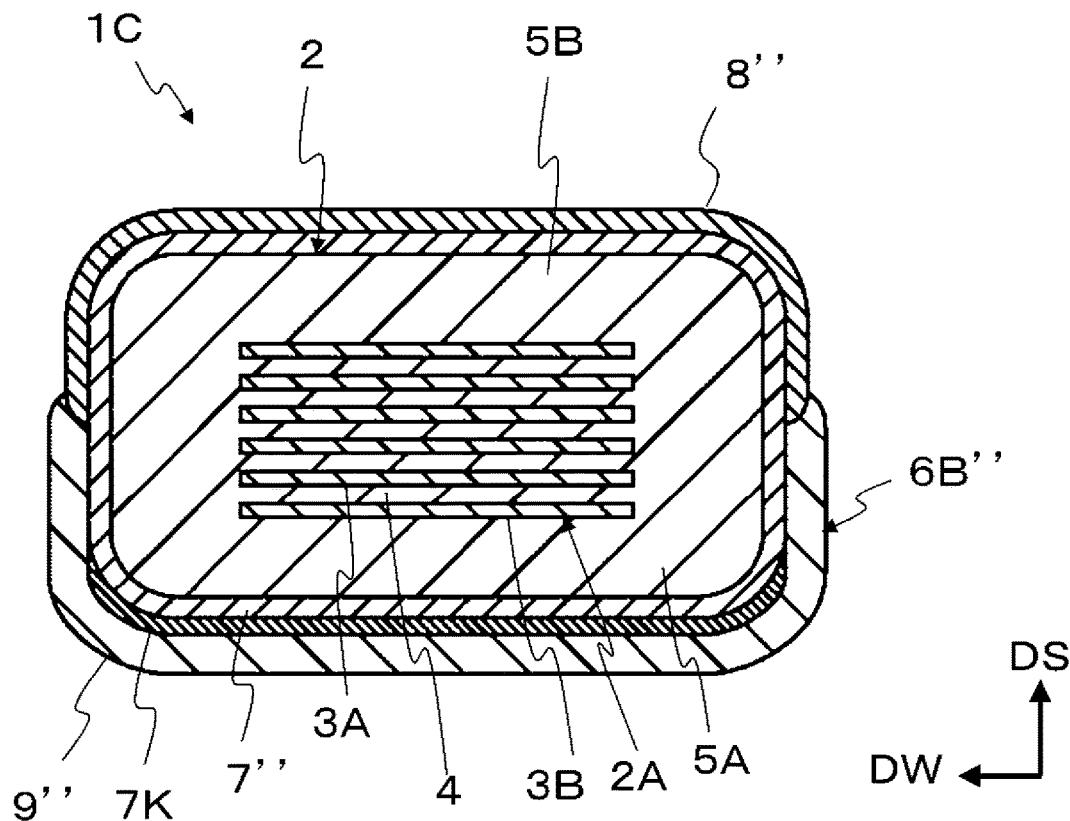
FIG. 7B is a cross-sectional view of the multilayer ceramic capacitor according to the fourth embodiment taken in the same manner as in FIG. 2B.
Figure 7C:
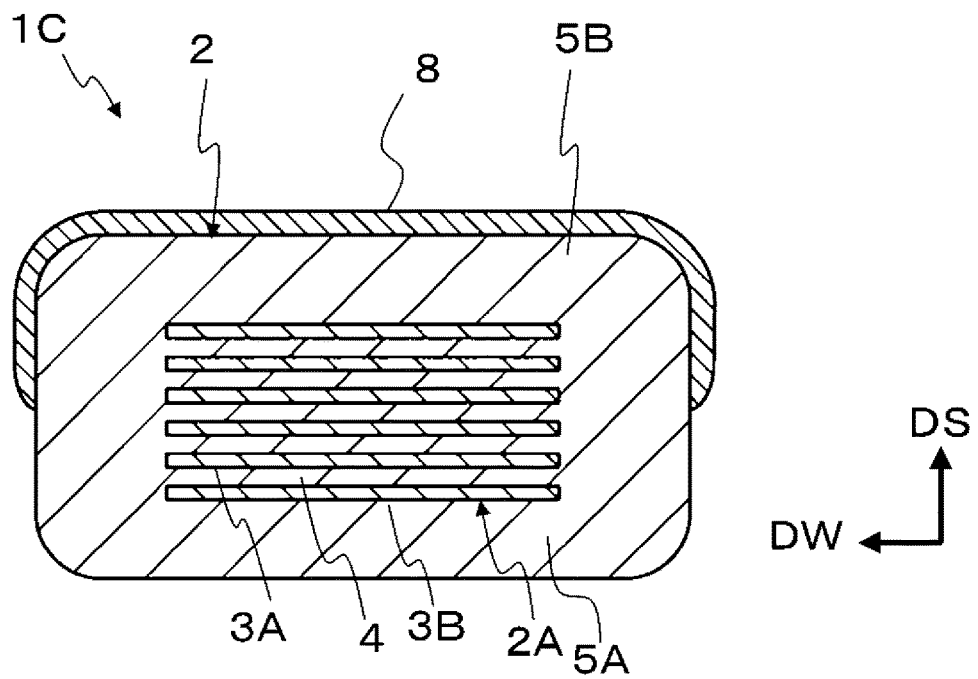
FIG. 7C is a cross-sectional view of the multilayer ceramic capacitor according to the fourth embodiment taken in the same manner as in FIG. 2C.

As shown in FIGS. 7A to 7C, the multilayer ceramic capacitor 1C has the element body 2, external electrodes 6A" and 6B", and an insulating layer 8". Each of the external electrode 6A" and 6B" has a base layer 7" formed on the element body 2, an electroconductive layer 7K connected with the conductive paste 7'", and a plating layer 9" formed on the base layer 7" and the electroconductive layer 7K.

The difference between the base layer 7" and the base layer 7 of FIG. 2A is that the base layer 7" is thinner than the base layer 7. It is preferable that the thickness of the base layer 7" is two micrometers or less. If the base layer 7" is thinner, the depth of dipping of the element body 2 when applying the conductive paste for the base layers to the element body 2 can be made small. By making the dipping depth of the element body 2 into the conductive paste small, the conductive paste for the base layers can be thinner, so that surface tension in the conductive paste for the base layers applied to the element body 2 is reduced. However, if the depth of dipping of the element body 2 is too small, the length of the conductive paste for the base layer and thus the length of the base layer 7" on the lower surface of the element body 2 may decrease.

To compensate for the decrease in the length of the base layer 7" on the lower surface of the element body 2, the electroconductive layer 7K is connected to the base layer 7" on the lower surface of the element body 2.

The thickness of the electroconductive layer 7K may be less than the thickness of the base layer 7". For example, in a case in which the thickness of the base layer 7" is two micrometers, the thickness of the electroconductive layer 7K may be 0.2 micrometers. The electroconductive layer 7K covers the base layer 7" on the lower surface of the element body 2 and covers a part of the lower surface of the element body 2.

The electroconductive layer 7K may have, for example, a two-layer structure composed of an inner Ti layer and an outer Cu layer. The inner Ti layer can improve the adhesiveness of the electroconductive layer 7K to the element body 2 and the base layer 7". The outer Cu layer can improve the adhesiveness of the electroconductive layer 7K to the plating layer 9". Each of the Ti layer and the Cu layer in the electroconductive layer 7K can be composed of, for example, a sputtered film. To form the layers on a part of the base layer 7" and the lower surface of the element body 2 by sputtering, the remaining part of the base layer 7" can be masked when sputtering is conducted.

In each of the external electrodes 6A" and 6B", the plating layer 9" is continuously formed on the lower portions of the side part, the front part, and the rear part of the base layer 7", the entirety of the electroconductive layer 7K, and a part of the lower surface of the element body 2. However, the plating layer 9" is not formed on the upper portions of the side part, the front part, and the rear part of the base layer 7" and the upper surface of the element body 2.

The insulating layer 8" is formed continuously to be placed on the upper surface of the element body 2 and on the upper parts, the side parts, the front parts, and the rear parts of the base layers 7" of the external electrodes 6A and 6B. The insulating layer 8" is not formed on the lower surface of the element body 2.

In this embodiment, although the base layer 7" is short by making the thickness of the base layer 7' thinner, since a composite film of the base layer 7" and the electroconductive layer 7K is used for an underlayer for the plating layer 9", the bottom areas of the external electrodes 6A" and 6B" can be expanded. Accordingly, stability of the electrical connection between the external electrodes 6A" and 6B" and land electrodes 42A and 42 on the mounting substrate 41 (see FIG. 5) can be ensured to improve the reliability of the multilayer ceramic capacitor 1C while it is possible to reduce the height of the multilayer ceramic capacitor 1C after mounting.

Fifth Embodiment

Figure 8:
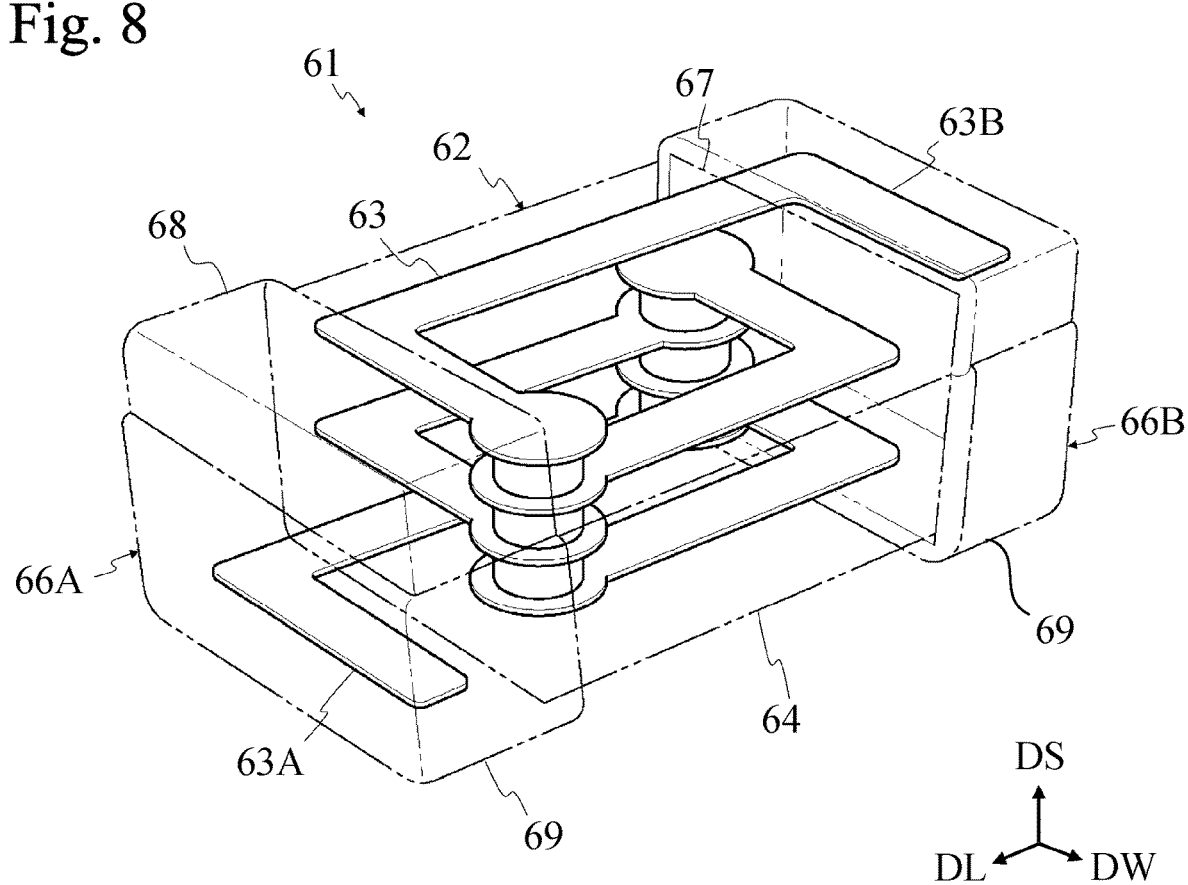
FIG. 8 is a perspective view showing a ceramic electronic component according to a fifth embodiment of the present invention.

FIG. 8 is a perspective view showing a ceramic electronic component according to a fifth embodiment of the present invention. In FIG. 8, a chip inductor is taken as an example as a ceramic electronic component.

The chip inductor 61 includes an element body 62, two external electrodes 66A and 66B, and an insulating layer 68. The element body 62 includes a coil pattern 63 that includes two terminal segments 63A and 63B formed at both ends thereof and a magnetic material 64. The magnetic material 64 is used as a dielectric to insulate the internal electrode layers formed by the coil pattern 63. The shape of the element body 62 may be a substantially rectangular parallelepiped shape.

The external electrodes 66A and 66B are located on opposite sides of the element body 62, respectively, so that the external electrodes 66A and 66B are spaced (separated) from each other. Each of the external electrodes 66A and 66B continuously extends from the side surface of the element body 62 to the front and rear surfaces and the top and bottom surfaces of the element body 62.

The coil pattern 63 is embedded in the magnetic material 64. However, the terminal segment 63A is exposed from the magnetic material 64 on one side of the element body 62 and is connected to the external electrode 66A, whereas the terminal segment 63B is exposed from the magnetic material 64 on the other side of the element body 62 and is connected to the external electrode 66B.

The material of the coil pattern 63 and the terminal segments 63A and 63B may be, for example, a metal such as Cu, Ni, Ti, Ag, Au, Pt, Pd, Ta, and W, or an alloy containing at least one of these metals. The magnetic material 64 is, for example, a ferrite.

Each of the external electrodes 66A and 66B can be configured in the same manner as that of the external electrodes 6A and 6B in FIG. 1. In other words, each of the external electrodes 66A and 66B has a base layer 67 and a plating layer 69. Each of the base layers 67 is continuously formed on the lower surface (mounting surface), the upper surface, the side surface, the front surface, and the rear surface of the element body 62. The base layer 67 may include co-material particles dispersed in a metal. The co-material is, for example, a ferrite component that is the main component of the magnetic material 64.

Each of the plating layers 69 is continuously formed on the lower surface, the lower portion of the side surface, the lower portion of the front surface, and the lower portion of the rear surface of the base layer 67. The plating layers 69 are not formed on the top surface of the element body 62.

An insulating layer 68 is formed on the top surface of the element body 62 opposite to the mounting surface (the bottom surface of the element body 62). The insulating layer 68 is thinner than the plating layers 69. The insulating layer 68 is continuously formed on the top surface of the element body 62 and the top surfaces, the side surfaces, the front surfaces, and the rear surfaces of the base layers 67.

Each of the plating layers 69 is continuously formed on the lower surface, the lower part of the side surface, the lower portion of the front surface, and the lower portion of the rear surface of the base layer 67, and is in contact with the insulating layer 68 on the side part, the front part, and the rear part of the base layer 67.

The boundary between the insulating layer 68 and the plating layer 69 is located on the side part, the front part, and the rear part of the base layer 67.

Each of the side part, the front part, and the rear part of the insulating layer 68 has a lower edge (corresponding to the boundary between the insulating layer 68 and the plating layer 69). The lower edge is located between the top surface and the bottom surface of the element body 62 and is located preferably distant at least 10 micrometers from the upper surface of the element body 62. The thickness of the insulating layer 68 is preferably from 0.01 micrometers to 5 micrometers.

The external dimensions of an example of the chip inductor 61 may be as follows: the length>the width>the height, or the length>the width=the height. To reduce the height of the chip inductor 61, the height of the chip inductor 61 is preferably 150 micrometers or less.

Since the thickness of the insulating layer 68 is less than that of the plating layer 69, the height of the chip inductor 61 can be made lower.

In addition, by forming the insulating layer 68 on the upper parts and the upper portions of the side parts of the base layer 67, it is possible to prevent the plating layer 69 from being formed on the upper parts and the upper portions of the side parts of the base layer 67. Accordingly, when the chip inductor 61 is mounted to a substrate with use of solder, it is possible to prevent solder from wetting up to protrude beyond the upper surface of the chip inductor 61 through the plating layer 69. This makes it possible to prevent the height of the chip inductor 61 from increasing after mounting on the substrate.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A ceramic electronic component comprising:
   an element body including a dielectric and internal electrodes, the element body having an upper surface, a lower surface, and side surfaces;
   a pair of external electrodes respectively formed on the side surfaces of the element body, each of the external electrodes including a base layer and a plating layer formed on at least a part of the base layer, the base layer of each of the external electrodes containing metal and being formed to continuously cover a portion of the lower surface of the element body and the corresponding side surface of the element body connected to the lower surface, the base layer of each of the external electrodes being electrically connected to one or more of the internal electrodes; and
   an insulating layer formed on the upper surface of the element body,
   wherein a boundary between the insulating layer and the plating layer of each of the external electrodes is positioned at a level between the upper surface and the lower surface of the element body and is distant at least 10 micrometers from the upper surface.

2. The ceramic electronic component according to claim 1, wherein the insulating layer has a thickness of 0.01 micrometers to five micrometers.

3. The ceramic electronic component according to claim 1,
   wherein the base layer of each of the external electrodes continuously covers the portion of the lower surface of the element body and the corresponding side surface as well as a portion of the upper surface of the element body connected to the side surfaces, and
   wherein the plating layer on each of the base layers continuously covers the portion of the lower surface of the element body and a portion of the corresponding side surface of the element body, the plating layer of each of the external electrodes being absent on the upper surface of the element body.

4. The ceramic electronic component according to claim 1,
   wherein the insulating layer continuously covers the upper surface and upper portions of the side surfaces of the element body that are connected to the upper surface, and
   wherein a boundary between the insulating layer and the plating layer of each of the external electrodes is located on a portion of the corresponding base layer that is on the corresponding side surface of the element body.

5. The ceramic electronic component according to claim 1,
   wherein the element body further has a front surface and a rear surface that are perpendicular to said side surfaces and the upper and lower surfaces, thereby the element body having a generally cuboid shape,
   wherein the base layer of each of the external electrodes continuously covers the corresponding side surface as well as respective portions of the upper and lower surfaces and the front and rear surfaces of the element body that are connected to the side surface,
   wherein the insulating layer continuously covers the upper surface and respective upper portions of the side surfaces and the front and rear surfaces of the element body that are connected to the upper surface, the insulating layer being absent on the lower surface, and wherein the plating layer of each of the external electrodes continuously covers the portion of the lower surface of the element body and respective lower portions of the corresponding side surface and the front and rear surfaces that are connected to the portion of the lower surface.

6. The ceramic electronic component according to claim 1, wherein the plating layers are absent on the upper surface of the element body, and a bottom edge of the insulating layer substantially abuts a top edge of the plating layer of each of the external electrodes.

7. The ceramic electronic component according to claim 1,
wherein the base layer of each of the external electrodes also covers a portion of the upper surface of the element body that is connected to the corresponding side surface, and
wherein the insulating layer covers an edge of the base layer of each of the external electrodes on the upper surface of the element body.

8. The ceramic electronic component according to claim 1, wherein the insulating layer includes a deposition film.

9. The ceramic electronic component according to claim 1, wherein the insulating layer has a Vickers hardness that is greater than a Vickers hardness of the element body.

10. The ceramic electronic component according to claim 1, wherein the insulating layer is made of at least one of a metal oxide, a nitride, diamond, and diamond-like carbon.

11. The ceramic electronic component according to claim 10, wherein the insulating layer is an oxide film of Al or an oxide film of Zr.

12. The ceramic electronic component according to claim 1,
wherein each of the external electrodes further includes an electroconductive layer formed on the lower surface of the element body and on a part of the base layer that is on the lower surface, the electroconductive layer having a thickness that is less than a thickness of the base layer.

13. The ceramic electronic component according to claim 11, wherein the base layer has a thickness that is two micrometers or less.

14. The ceramic electronic component according to claim 1, wherein the base layer contains a co-material dispersed in the metal.

15. The ceramic electronic component according to claim 14, wherein the co-material is an oxide ceramic.

16. The ceramic electronic component according to claim 1,
wherein the element body includes, as the internal electrodes, a first internal electrode and a second internal electrode laminated over the first internal electrode via said dielectric interposed therebetween,
wherein one of the external electrodes is connected to the first internal electrode at one of the side surfaces of the element body and another of the external electrodes is connected to the second internal electrode at another of the side surfaces of the element body.

17. An arrangement comprising:
a mounting substrate; and
the ceramic electronic component according to claim 1 mounted on a surface of the mounting substrate, the ceramic electronic component being connected to the mounting substrate via solder layers, the solder layers being adhered to the plating layers of the external electrode, respectively,
wherein each of the solder layers is in surface contact with a side surface of the corresponding plating layer and is located below an upper surface of the insulating layer.

18. The ceramic electronic component according to claim 1, wherein the insulating layer has a thickness that is less than a thickness of the plating layer of each of the external electrodes.

19. A method of manufacturing a ceramic electronic component, the method comprising:
forming an element body that includes a dielectric and internal electrodes, the element body having an upper surface, a lower surface, and side surfaces;
applying a base material for base layers of external electrodes onto the lower surface and the side surfaces of the element body;
sintering the base material to form the base layers of external electrodes, the base layer of each of the external electrodes having a lower part formed on the lower surface of the element body and a side part formed on one of the side surfaces of the element body and being electrically connected to one or more of the internal electrodes;
thereafter, forming an insulating layer on the upper surface of the element body and on respective portions of the base layers that are respectively on the side surfaces of the element body; and
forming plating layers on the base layers, respectively, each of the plating layers being formed on the lower part and portion of the side part of the corresponding base layer, such that a boundary between the insulating layer and the plating layer of each of the external electrodes is positioned at a level between the upper surface and the lower surface of the element body and is distant at least 10 micrometers from the upper surface.

20. The method according to claim 19, wherein forming the insulating layer includes depositing an insulating material.

* * * * *